United States Patent
Taniguchi et al.

(10) Patent No.: US 7,954,105 B2
(45) Date of Patent: May 31, 2011

(54) SYSTEM FOR LIMITING RESOURCE USAGE BY FUNCTION MODULES BASED ON LIMITING CONDITIONS AND MEASURED USAGE

(75) Inventors: Shinya Taniguchi, Suwa (JP); Akihito Fukao, Chino (JP)

(73) Assignee: Seiko Epson Corporation (JP)

( * ) Notice: Subject to any disclaimer, the term of this patent is extended or adjusted under 35 U.S.C. 154(b) by 1286 days.

(21) Appl. No.: 11/297,719

(22) Filed: Dec. 8, 2005

(65) Prior Publication Data
US 2006/0143325 A1 Jun. 29, 2006

(30) Foreign Application Priority Data

Dec. 27, 2004 (JP) ................................. 2004-375708
Sep. 14, 2005 (JP) ................................. 2005-266761

(51) Int. Cl.
*G06F 9/46* (2006.01)
*H04N 1/00* (2006.01)
(52) U.S. Cl. ........................................ 718/104; 358/404
(58) Field of Classification Search .................. 718/100, 718/1, 104; 358/404
See application file for complete search history.

(56) References Cited

U.S. PATENT DOCUMENTS

| | | | |
|---|---|---|---|
| 5,274,813 A | 12/1993 | Itoh | |
| 5,915,085 A | 6/1999 | Koved | |
| 6,105,137 A | 8/2000 | Graunke et al. | |
| 6,148,401 A | 11/2000 | Devanbu et al. | |
| 6,308,317 B1 | 10/2001 | Wilkinson et al. | |
| 6,405,327 B1 | 6/2002 | Sipple et al. | |
| 6,772,106 B1 | 8/2004 | Mahlke et al. | |
| 2002/0013802 A1* | 1/2002 | Mori et al. | 709/1 |
| 2002/0120660 A1 | 8/2002 | Hay et al. | |
| 2003/0088651 A1* | 5/2003 | Wilson, Jr. | 709/221 |
| 2003/0214666 A1 | 11/2003 | Osada | |
| 2004/0167859 A1 | 8/2004 | Mirabella | |
| 2004/0199764 A1 | 10/2004 | Koechling et al. | |
| 2004/0226015 A1* | 11/2004 | Leonard et al. | 718/100 |
| 2004/0267868 A1 | 12/2004 | Wilk | |

FOREIGN PATENT DOCUMENTS

EP 1349077 10/2003
(Continued)

OTHER PUBLICATIONS

Parrish, M., Grandma relives childhood with her first Easy-Bake Oven [online], Dec. 22, 2003 [retrieved Dec. 9, 2009]. Retrieved from the Internet:< URL: http://www.post-gazette.com/food/20031222easybake1222fnp1.asp>.*

(Continued)

*Primary Examiner* — Meng-Ai An
*Assistant Examiner* — Brian Chew
(74) *Attorney, Agent, or Firm* — Harness, Dickey & Pierce, P.L.C.

(57) ABSTRACT

A resource management system that manages a resource that a first function module and a plurality of second function modules that necessitates the first function module in execution thereof use. The system includes: a first resource limiting unit that limits a volume of resource that an entirety of the first function module and the plurality of second function modules uses; a resource limiting information acquisition unit that acquires resource limiting information that shows a limiting condition of the resource; and a second resource limiting unit that limits, based on the resource limiting information acquired at the resource limiting information acquisition unit, a volume of the resource that at least one of the plurality of second function modules uses.

4 Claims, 15 Drawing Sheets

FOREIGN PATENT DOCUMENTS

| | | |
|---|---|---|
| EP | 1 475 710 A1 | 11/2004 |
| GB | 2249414 | 5/1992 |
| JP | 2000-215089 | 8/2000 |
| JP | 2003-076562 | 3/2003 |
| JP | 2003-108409 | 4/2003 |
| JP | 2003-330732 | 11/2003 |
| JP | 2004-094782 | 3/2004 |
| JP | 2004-122773 | 4/2004 |
| WO | WO 01/35223 | 5/2001 |
| WO | WO 01/40900 | 6/2001 |

OTHER PUBLICATIONS

Wadge, Wallace. "Achieiving Gigabit Performance on Programmable Ethernet Network Interface Cards", May 29, 2001.*

"HBench:Java: An application-specific benchmarking framework for Java Virtual Machines", Concurrency and Computation Practice & Experience Wiley UK, vol. 13, No. 8-9, Jul. 2001, pp. 775-792, XP002468828 ISSN: 1532-0626.

Shiping Chen, Yan Liu, Ian Gorton, Anna Liu: "Performance prediction of component-based applications" The Journal of Systems and Software, No. 74, Jan. 21, 2004, pp. 35-43, XP002468829.

Xiaolan Zhang: "Application-specific Benchmarking" [Online] May 2001, XP002468832, Chapter 2-4.

Czajkowski G. et al: "JRes: a resource accounting interface for Java" SIGPLAN Notices ACM USA, vol. 33, No. 10, Oct. 1998, pp. 21-35, XP002469308 ISSN: 0362-1340.

Rayside D et al: "Extracting Java library subsets for deployment on embedded systems" Proceedings of the Third European Conference on Software Maintenance and Reengineering (CAT. No. PR00090) IEEE Comput. Soc Los Alamitos, CA, USA, 1999, pp. 102-110, XP002469309 ISBN: 0-7695-0090-0.

Posegga J et al: "Byte code verification for Java smart cards based on model checking" Proceedings of the European Symposium on Research in Computer Security (ESORICS), Springer Verlag, Berlin, DE, Oct. 18, 1998, pp. 175-190, XP002447200.

Aspinall D. et al: "Mobile resource guarantees for smart devices" Construction and Analysis of Safe, Secure, and Interoperable Smart Devices. International Workshop, CASSIS 2004. Revised Selected Papers (Lecture Notes in Computer Science vol. 3362) Springer-Verlag Berlin, Germany, Jan. 28, 2005, pp. 1-26, XP002469525.

* cited by examiner

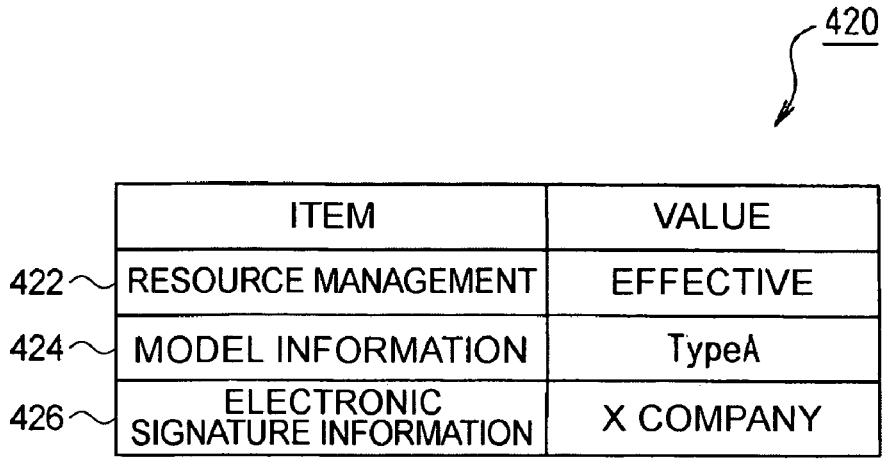

| ITEM | VALUE |
|---|---|
| 422 — RESOURCE MANAGEMENT | EFFECTIVE |
| 424 — MODEL INFORMATION | TypeA |
| 426 — ELECTRONIC SIGNATURE INFORMATION | X COMPANY |

FIG. 5

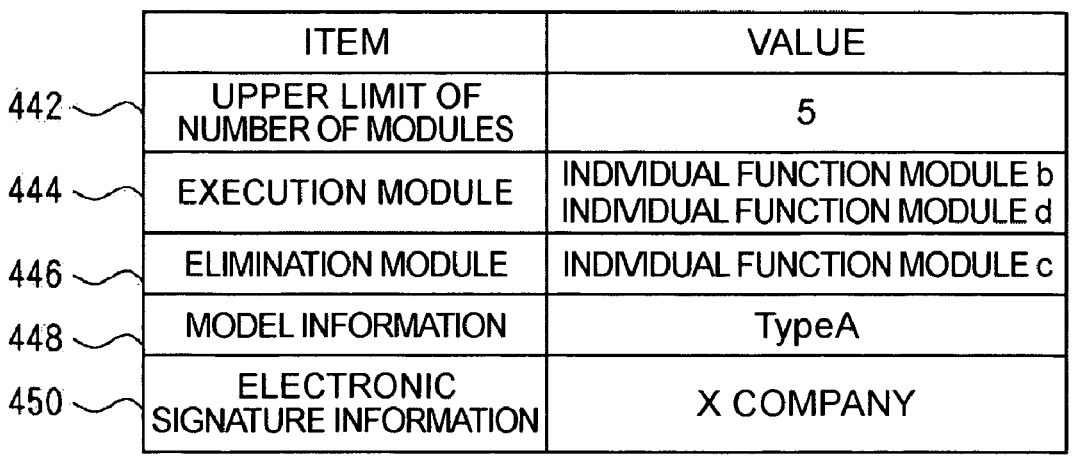

| ITEM | VALUE |
|---|---|
| 442 — UPPER LIMIT OF NUMBER OF MODULES | 5 |
| 444 — EXECUTION MODULE | INDIVIDUAL FUNCTION MODULE b<br>INDIVIDUAL FUNCTION MODULE d |
| 446 — ELIMINATION MODULE | INDIVIDUAL FUNCTION MODULE c |
| 448 — MODEL INFORMATION | TypeA |
| 450 — ELECTRONIC SIGNATURE INFORMATION | X COMPANY |

FIG. 6

SYSTEM FOR LIMITING RESOURCE USAGE BY FUNCTION MODULES BASED ON LIMITING CONDITIONS AND MEASURED USAGE

RELATED APPLICATIONS

This application claims priority to Japanese Patent Application No. 2004-375708 filed Dec. 27, 2004 and 2005-266761 filed Sep. 14, 2005 which are hereby expressly incorporated by reference herein in their entirety.

BACKGROUND

1. Technical Field

The invention relates to a resource management system, printer, network card and program, and method. In particular, the invention relates to a resource management system, a printer, a printer network card and a resource management program, and a resource management method that preferably reduces the likelihood of a software operation becoming instable and thereby can suppress resource usage from increasing.

2. Related Art

So far, as a technology that manages resources such as hardware, for instance, a resource management system described in JP-A No. 2004-94782 and an image formation unit described in JP-A No. 2003-330732 are known.

The invention disclosed in JP-A No. 2004-94782 is constituted by including a limit setter that sets a range operable to a resource that is utilized when software is executed on an information device; and an operation range verifier that verifies that the software is operated within an operable range set by the limit setter. The operation range verifier, when demanded from the software to use the resource, compares an operable range that is set and a volume of the demanded resource, and, when it is outside of the operable range, the software is stopped from executing.

In the invention described in JP-A No. 2003-330732, an image formation device that has a first execution environment and a second execution environment, is constituted by including a resource management portion that manages resources such as memories that the second execution environment uses. The resource management portion limits resources that the second execution environment can use.

An execution environment of a JAVA (registered trade mark) application is made of three execution environments where an application called JVM (Java (registered trade mark) Virtual Machine) is executed on an OS (Operating System) and a JAVA (registered trade mark) class set made of a plurality of JAVA (registered trade mark) classes is executed on the JVM.

FIGS. 18A and 18B are diagrams describing an execution environment of the JAVA (registered trade mark) application.

When the inventions described in JP-A Nos. 2004-94782 and 2003-330732 are applied to such an environment, as shown in FIG. 18A, a volume of the OS resource that the JVM uses can be limited.

On the JVM, in some cases, a plurality of JAVA (registered trade mark) class sets is executed in parallel. In this case, although a volume of the resource that the JVM uses can be limited, on the JVM, the JAVA (registered trade mark) class set can freely use the resource in the limited range thereof. Accordingly, when a certain JAVA (registered trade mark) class set uses the resource close to an operable upper limit value, other JAVA (registered trade mark) class sets cannot be executed, resulting in a problem in that an operation becomes instable.

The JAVA (registered trade mark) class set, necessitating the JVM in execution thereof, is not able to execute directly on the OS. Accordingly, when the inventions of JP-A Nos. 2004-94782 and 2003-330732 are applied to try to limit a volume of the resource that the respective JAVA (registered trade mark) class sets use, as shown in FIG. 18B, there is no way other than executing the JVM respectively for one JAVA (registered trade mark) class set. However, according to such an execution method, with an increase in the JAVA (registered trade mark) class sets, the JVMs increase as well. That is, a volume of resources used as a whole increases to be impractical.

Furthermore, other than a volume that the JAVA (registered trade mark) class set itself uses, when a volume of a resource that the JVM uses to execute the JAVA (registered trade mark) class set is also large, a problem similar to the above is caused. For instance, in a JAVA (registered trade mark) class set where many instances are simultaneously generated for instance, the JVM uses a large volume of resources to generate instances.

SUMMARY

In this connection, the invention is achieved by paying attention to unsolved problems that such existing technologies have and intends to provide a resource management system, a printer, a printer network card and a resource management program, and a resource management method that can preferably reduce the likelihood of a software operation from becoming instable and suppress a volume of resource used from increasing.

Mode 1: In order to achieve the above object, a resource management system according to mode 1 is a resource management system that manages a resource that a first function module and a plurality of second function modules that necessitates the first function module in execution thereof use. The resource management system includes a first resource limiting unit that limits a volume of resource that an entirety of the first function module and the plurality of second function modules uses; a resource limiting information acquisition unit that acquires resource limiting information that shows a limiting condition of the resource; and a second resource limiting unit that limits, based on the resource limiting information acquired at the resource limiting information acquisition unit, a volume of the resource that at least one of the plurality of second function modules uses.

When thus configured, by use of the first resource limiting unit, a volume of a resource that an entirety of a first function module and a plurality of second function modules uses is limited. Furthermore, by use of a resource limiting information acquisition unit, the resource limiting information is acquired, and, by use of the second resource limiting unit, based on the acquired resource limiting information, a volume of a resource that at least one of the plurality of second function modules uses is limited.

Thereby, a first function module and a plurality of second function modules as a whole, a volume of resource can be limited, and, even on the basis of the second function module, a volume of resource can be limited. Accordingly, an advantage can be obtained in that, more than ever, the likelihood of a software operation becoming instable due to the resource deficiency can be reduced. Furthermore, since on a second function module basis a volume of resource is limited, a plurality of first function modules can be done without executing; accordingly, an advantage in that, more than ever, an increase in a volume of resource used can be suppressed can be obtained as well.

Here, the resource means a resource that software can use and includes, without being restricted to hardware resources, software resources and other resources. Furthermore, the resource means a resource that an execution environment for operating function modules supplies. In what follows, the same applies to a resource management system according to mode 3, printers according to modes 6 and 8, printer network cards according to modes 11 and 13, resource management programs according to modes 16 and 18, and resource management methods according to modes 21, 22, 24 and 25.

Still furthermore, as a volume of a resource, for instance, a volume of memory that function modules use or the number of startable function modules is contained. Furthermore, a volume of a resource (volume of memory and the number of function modules) that, for instance, an application that uses the function module secures is included. In what follows, the same applies to a resource management system according to mode 3, printers according to modes 6 and 8, printer network cards according to modes 11 and 13, resource management programs according to modes 16 and 18, and resource management methods according to modes 21, 22, 24 and 25.

As a limiting condition of a resource, for instance, the upper limit value of the resource can be set. In what follows, the same applies to a resource management system according to mode 3, printers according to modes 6 and 8, printer network cards according to modes 11 and 13, resource management programs according to modes 16 and 18, and resource management methods according to modes 21, 22, 24 and 25.

As to use a resource, for instance, to secure the resource is included. In what follows, the same applies to a resource management system according to mode 3, printers according to modes 6 and 8, printer network cards according to modes 11 and 13, resource management programs according to modes 16 and 18, and resource management methods according to modes 21, 22, 24 and 25.

Furthermore, as to manage the resource, for instance, to limit the resource is included. Still furthermore, as to limit the resource, for instance, that in order not to exceed a particular absolute volume, a resource exceeding the absolute volume is not secured is included. More specifically, a series of processes such that an operation that uses a resource is captured, a volume of a resource being used is measured, a volume of a resource is accumulated, a resource limiting value and an accumulated value are compared, a permission of the use of the resource is judged, when it can not be permitted, the resource is not secured, and when it can be permitted, the resource is secured is included. In what follows, the same applies to a resource management system according to mode 3, printers according to modes 6 and 8, printer network cards according to modes 11 and 13, resource management programs according to modes 16 and 18, and resource management methods according to modes 21, 22, 24 and 25.

The resource limiting information acquisition unit, as far as it can acquire the resource limiting information, may have any configurations. For instance, the resource limiting information may be input from an input device, may be acquired or received from an external device, may be read out of a memory device or a memory medium, or may be extracted from software and other data. Accordingly, in the acquisition, at least input, acquisition, reception, reading and extraction are included. In what follows, the same can be applied to a resource management system according to mode 3, printers according to modes 6 and 8 and printer network cards according to modes 11 and 13.

As to acquire the resource limiting information, acquisition of an absolute value of resource limitation from, for instance, a setting file is included. In what follows, the same can be applied to a resource management system according to mode 3, printers according to modes 6 and 8, printer network cards according to modes 11 and 13, resource management programs according to modes 16 and 18, and resource management methods according to modes 21, 22, 24 and 25.

Furthermore, the function module means a program for realizing one function. In what follows, the same can be applied to a resource management system according to mode 3, printers according to modes 6 and 8, printer network cards according to modes 11 and 13, resource management programs according to modes 16 and 18, and resource management methods according to modes 21, 22, 24 and 25.

Still furthermore, to necessitate the first function module in executing the second function module means to call out the first function module when for instance the second function module is executed or to utilize the first function module when the second function module is executed. In what follows, the same applies to a resource management system according to mode 3, printers according to modes 6 and 8, printer network cards according to modes 11 and 13, resource management programs according to modes 16 and 18, and resource management methods according to modes 21, 22, 24 and 25.

Furthermore, the system may be realized as a single device, terminal or other equipment or may be realized as a network system in which a plurality of devices, terminals and other equipment is communicably connected. In the latter case, the respective constituent elements, as far as these are communicably connected, may belong to any one of a plurality of devices. In what follows, the same applies to a resource management system according to mode 3.

Mode 2: A resource management system according to mode 2 is characterized in that, in the resource management system according to mode 1, a volume of a resource that is limited by the second resource limiting unit is a volume of a resource that the second function module uses, and a volume of a resource that the first function module uses to execute the second function module.

When thus configured, the second resource limiting unit limits a volume of a resource that the second function module uses and a volume of a resource that the first function module uses to execute the second function module.

Thereby, a volume of a resource that the first function module uses can be limited on a basis of a second function module; accordingly, there is an advantage in that the likelihood of a software operation becoming instable due to the deficiency of the resource can be further reduced.

Mode 3: A resource management system according to mode 3 is a resource management system that manages a resource that a first function module and a plurality of second function modules that necessitates the first function module in execution thereof use. The resource management system includes; a resource limiting information acquisition unit that acquires resource limiting information that shows a limiting condition of a resource; and a resource limiting unit that limits, based on the resource limiting information acquired at the resource limiting information acquisition unit, a volume of the resource that the first function module uses to execute the second function module.

When thus configured, by use of the resource limiting information acquisition unit, the resource limiting information can be acquired, and the resource limiting unit, based on the acquired resource limiting information, limits a volume of the resource that the first function module uses to execute the second function module.

Thereby, a volume of the resource that the first function module uses can be limited on a basis of a second function module; accordingly, there is an advantage in that the likelihood of a software operation becoming instable due to the deficiency of the resource can be reduced more than ever. Furthermore, since on a basis of a second function module a volume of a resource is limited, a plurality of first function modules can be done without executing; accordingly, an advantage in that, more than ever, an increase in a resource used can be suppressed can be obtained as well.

Mode 4: Furthermore, a resource management system according to mode 4 is characterized in that, in the resource management system according to mode 3, a volume of a resource that is limited by the resource limiting unit is a volume that the second function module uses, and a volume of a resource that the first function module uses to execute the second function module.

When thus configured, the resource limiting unit limits a volume of a resource that the second function module uses and a volume of a resource that the first function module uses to execute the second function module.

Mode 5: Still furthermore, a resource management system according to mode 5 is characterized in that, in the resource management system according to any one of modes 1 through 4, the second function module is made of one or a plurality of JAVA (registered trade mark) classes; and the first function module is an execution control application that controls an execution of the JAVA (registered trade mark) class.

When thus configured, a volume of the resource that the JAVA (registered trade mark) class uses or a volume of the resource that the execution control application uses to execute the JAVA (registered trade mark) class can be limited.

Thereby, an advantage can be obtained in that the likelihood of a software operation becoming instable due to the deficiency of the resource in an execution environment of the JAVA (registered trade mark) application can be reduced.

Now, the JAVA (registered trade mark) class means a program in which data in a JAVA (registered trade mark) language and a method (function) that is an operational procedure thereof are summarized. Furthermore, the JAVA (registered trade mark) means an execution environment that makes use of a virtual machine and can be applied to all categories called a virtual machine that is operated on the OS. In what follows, the same applies to a printer according to mode 10, a printer network card according to mode 15, a resource management program according to mode 20, and a resource management method according to mode 27.

Furthermore, the application means a program that provides a particular function made of a plurality of JAVA (registered trade mark) classes. In what follows, the same applies to a printer according to mode 10, a printer network card according to mode 15, a resource management program according to mode 20, and a resource management method according to mode 27.

Mode 6: On the other hand, in order to achieve the object, a printer according to mode 6 is a printer that manages a resource that a first function module and a plurality of second function modules that necessitates the first function module in execution thereof use. The printer is characterized by including:

a first resource limiting unit that limits a volume of a resource that an entirety of the first function module and the plurality of second function modules use; a resource limiting information acquisition unit that acquires resource limiting information that shows a limiting condition of a resource; and a second resource limiting unit that, based on the resource limiting information acquired at the resource limiting information acquisition unit, limits a volume of a resource that at least one of the plurality of second function modules uses.

When thus configured, an operation and an advantage identical as that of the resource management system according to mode 1 can be obtained.

Mode 7: Furthermore, a printer according to mode 7 is characterized in that, in the printer according to mode 6, a volume of a resource that is limited by the second resource limiting unit is a volume of a resource that the second function module uses and a volume of a resource that the first function module uses to execute the second function module.

When thus configured, an operation and an advantage identical as that of the resource management system according to mode 2 can be obtained.

Mode 8: Still furthermore, a printer according to mode 8 is a printer that manages a resource that a first function module and a plurality of second function modules that necessitates the first function module in the execution thereof use. The printer is characterized by including:

a resource limiting information acquisition unit that acquires resource limiting information that shows a limiting condition of a resource; and a resource limiting unit that, based on the resource limiting information acquired at the resource limiting information acquisition unit, limits a volume of a resource that the first function module uses to execute the second function modules.

When thus configured, an operation and an advantage identical as that of the resource management system according to mode 3 can be obtained.

Mode 9: Furthermore, a printer according to mode 9 is characterized in that, in the printer according to mode 8, a volume of a resource that is limited by the resource limiting unit is a volume of a resource that the second function module uses and a volume of a resource that the first function module uses to execute the second function module.

When thus configured, an operation and an advantage identical as that of the resource management system according to mode 4 can be obtained.

Mode 10: Still furthermore, a printer according to mode 10 is characterized in that, in the printer according to any one of modes 6 through 9, the second function module is made of one or a plurality of JAVA (registered trade mark) classes; and the first function module is an execution control application that controls an execution of the JAVA (registered trade mark) class.

When thus configured, an operation and an advantage identical as that of the resource management system according to mode 5 can be obtained.

Mode 11: On the other hand, in order to achieve the object, a printer network card according to mode 11 is a printer network card that manages a resource that a first function module and a plurality of second function modules that necessitates the first function module in the execution thereof use. The printer network card is characterized by including:

a first resource limiting unit that limits a volume of a resource that an entirety of the first function module and the plurality of second function modules use; a resource limiting information acquisition unit that acquires resource limiting information that shows a limiting condition of a resource; and a second resource limiting unit that, based on the resource limiting information acquired at the resource limiting information acquisition unit, limits a volume of a resource that at least one of the plurality of second function modules uses.

When thus configured, when the printer network card is mounted on a printer, an operation and an advantage identical as that of the resource management system according to mode 1 can be obtained.

Mode 12: Furthermore, a printer network card according to mode 12 is characterized in that, in the printer network card according to mode 11, a volume of a resource that is limited by the second resource limiting unit is a volume of a resource that the second function module uses and a volume of a resource that the first function module uses to execute the second function module.

When thus configured, when the printer network card is mounted on the printer, an operation and an advantage identical as that of the resource management system according to mode 2 can be obtained.

Mode 13: Still furthermore, a printer network card according to mode 13 is a printer network card that manages a resource that a first function module and a plurality of second function modules that necessitates the first function module in the execution thereof use. The printer network card is characterized by including:

a resource limiting information acquisition unit that acquires resource limiting information that shows a limiting condition of a resource; and a resource limiting unit that, based on the resource limiting information acquired at the resource limiting information acquisition unit, limits a volume of a resource that the first function module uses to execute the second function modules.

When thus configured, when the printer network card is mounted on the printer, an operation and an advantage identical as that of the resource management system according to mode 3 can be obtained.

Mode 14: Furthermore, a printer network card according to mode 14 is characterized in that, in the printer network card according to mode 13, a volume of a resource that is limited by the resource limiting unit is a volume of a resource that the second function module uses and a volume of a resource that the first function module uses to execute the second function module.

When thus configured, when the printer network card is mounted on the printer, an operation and an advantage identical as that of the resource management system according to mode 4 can be obtained.

Mode 15: Still furthermore, a printer network card according to mode 15 is characterized in that, in the printer network card according to any one of modes 11 through 14, the second function module is made of one or a plurality of JAVA (registered trade mark) classes; and the first function module is an execution control application that controls an executive of the JAVA (registered trade mark) class.

When thus configured, when the printer network card is mounted on a printer, an operation and an advantage identical as that of the resource management system according to mode 5 can be obtained.

Mode 16: On the other hand, in order to achieve the object, a resource management program according to mode 16 is a resource management program that manages a resource that a first function module and a plurality of second function modules that necessitates the first function module in an execution thereof use. The resource management program is characterized by including:

a program that allows a computer to execute a procedure including; a first resource limiting step that limits a volume of a resource that an entirety of the first function module and the plurality of second function modules use; a resource limiting information acquisition step that acquires resource limiting information that shows a limiting condition of a resource; and a second resource limiting step that, based on the resource limiting information acquired at the resource limiting information acquisition step, limits a volume of a resource that at least one of the plurality of second function modules uses.

When thus configured, when the computer reads the program and executes a procedure according to the read program, an operation and an advantage identical as that of the resource management system according to mode 1 can be obtained.

Now, the resource limiting information acquisition step, as far as it can acquire the resource limiting information, may have any configurations. For instance, the resource limiting information may be input from an input device, may be acquired or received from an external device, may be read out of a memory device or a memory medium, or may be extracted from software or other data. Accordingly, in the acquisition, at least input, acquisition, reception, reading and extraction are included. In what follows, the same applies to a resource management program according to mode 18 and resource management methods according to modes 21, 22, 24 and 25.

Mode 17: Furthermore, a resource management program according to mode 17 is characterized in that, in the resource management program according to mode 16, a volume of a resource that is limited by the second resource limiting step is a volume of a resource that the second function module uses and a volume of a resource that the first function module uses to execute the second function module.

When thus configured, when the computer reads the program and executes a procedure according to the read program, an operation and an advantage identical as that of the resource management system according to mode 2 can be obtained.

Mode 18: Furthermore, a resource management program according to mode 18 is a resource management program that manages a resource that a first function module and a plurality of second function modules that necessitates the first function module in an execution thereof use. The resource management program is characterized by including:

a program that allows a computer to execute a procedure including; a resource limiting information acquisition step that acquires resource limiting information that shows a limiting condition of a resource; and a resource limiting step that, based on the resource limiting information acquired at the resource limiting information acquisition step, limits a volume of a resource that the first function module uses to execute the second function module.

When thus configured, when the computer reads the program and executes a procedure according to the read program, an operation and an advantage identical as that of the resource management system according to mode 3 can be obtained.

Mode 19: Furthermore, a resource management program according to mode 19 is characterized in that, in the resource management program according to mode 18, a volume of a resource that is limited by the resource limiting step is a volume of a resource that the second function module uses and a volume of a resource that the first function module uses to execute the second function module.

When thus configured, when the computer reads the program and executes a procedure according to the read program, an operation and an advantage identical as that of the resource management system according to mode 4 can be obtained.

Mode 20: Still furthermore, a resource management program according to mode 20 is characterized in that, in the resource management programs according to any one of modes 16 through 19, the second function module is made of one or a plurality of JAVA (registered trade mark) classes; and the first function module is an execution control application that controls an execution of the JAVA (registered trade mark) class.

When thus configured, when the computer reads the program and executes a procedure according to the read program, an operation and an advantage identical as that of the resource management system according to mode 5 can be obtained.

Mode 21: On the other hand, in order to achieve the object, a resource management method according to mode 21 is a resource management method that manages a resource that a first function module and a plurality of second function modules that necessitates the first function module in the execution thereof use. The resource management method is characterized by including:

a first resource limiting step that limits a volume of a resource that an entirety of the first function module and the plurality of second function modules use; a resource limiting information acquisition step that acquires resource limiting information that shows a limiting condition of a resource; and a second resource limiting step that, based on the resource limiting information acquired at the resource limiting information acquisition step, limits a volume of a resource that at least one of the plurality of second function modules uses.

Thereby, an advantage identical as that of the resource management system according to mode 1 can be obtained.

Mode 22: Furthermore, a resource management method according to mode 22 is a resource management method that manages a resource that a first function module and a plurality of second function modules that necessitates the first function module in the execution thereof use. The resource management method is characterized by including:

a first resource limiting step where a calculating unit limits a volume of a resource that an entirety of the first function module and the plurality of second function modules use;

a resource limiting information acquisition step where the calculating unit acquires resource limiting information that shows a limiting condition of a resource; and a second resource limiting step where the calculating unit, based on the resource limiting information acquired at the resource limiting information acquisition step, limits a volume of a resource that at least one of the plurality of second function modules uses.

Thereby, an advantage identical as that of the resource management system according to mode 1 can be obtained.

Mode 23: Still furthermore, a resource management method according to mode 23 is characterized in that, in the resource management method according to any one of modes 21 and 22, a volume of a resource that is limited by the second resource limiting step is a volume of a resource that the second function module uses and a volume of a resource that the first function module uses to execute the second function module.

Thereby, an advantage identical as that of the resource management system according to mode 2 can be obtained.

Mode 24: Furthermore, a resource management method according to mode 24 is a resource management method that manages a resource that a first function module and a plurality of second function modules that necessitates the first function module in the execution thereof use. The resource management method is characterized by including:

a resource limiting information acquisition step that acquires resource limiting information that shows a limiting condition of a resource; and a resource limiting step that, based on the resource limiting information acquired at the resource limiting information acquisition step, limits a volume of a resource that the first function module uses to execute the second function module.

Thereby, an advantage identical as that of the resource management system according to mode 3 can be obtained.

Mode 25: Still furthermore, a resource management method according to mode 25 is a resource management method that manages a resource that a first function module and a plurality of second function modules that necessitates the first function module in an execution thereof use. The resource management method is characterized by including:

a resource limiting information acquisition step where a calculating unit acquires resource limiting information that shows a limiting condition of a resource; and a resource limiting step that, based on the resource limiting information acquired at the resource limiting information acquisition step, the calculating unit limits a volume of a resource that the first function module uses to execute the second function modules.

Thereby, an advantage identical as that of the resource management system according to mode 3 can be obtained.

Mode 26: Furthermore, a resource management method according to mode 26 is characterized in that, in the resource management method according to any one of modes 24 and 25, a volume of a resource that is limited by the resource limiting step is a volume of a resource that the second function module uses and a volume of a resource that the first function module uses to execute the second function module.

Thereby, an advantage identical as that of the resource management system according to mode 4 can be obtained.

Mode 27: Still furthermore, a resource management method according to mode 27 is characterized in that, in the resource management method according to any one of modes 21 through 26, the second function module is made of one or a plurality of JAVA (registered trade mark) classes; and the first function module is an execution control application that controls an execution of the JAVA (registered trade mark) class.

Thereby, an advantage identical as that of the resource management system according to mode 5 can be obtained.

BRIEF DESCRIPTION OF THE DRAWINGS

The invention will be described with reference to the accompanying drawings, wherein like numbers reference like elements.

FIG. 5 is a diagram showing a data structure of module information 420.

FIG. 6 is a diagram showing a data structure of an execution environment information registration table 440.

DESCRIPTION OF EXEMPLARY EMBODIMENTS

In what follows, a first embodiment according to an aspect of the invention will be described with reference to the drawings. FIGS. 1 through 17 are diagrams showing first embodiments of a resource management system, a printer, a printer network card and a resource management program, and a resource management method according to an aspect of the invention.

Figure 2:
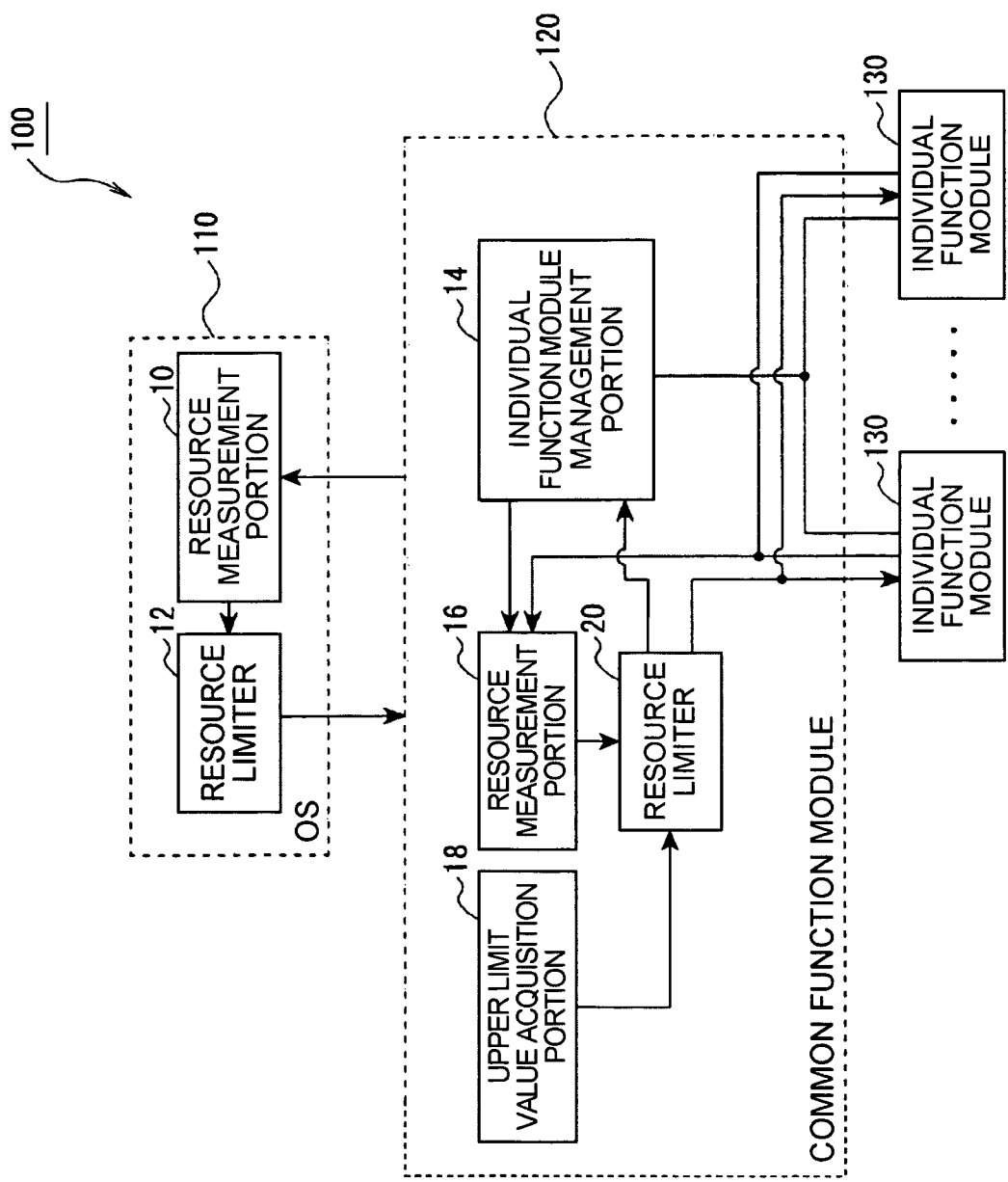
FIG. 2 is a functional block diagram showing a function outline of a network printer 100.

In the embodiment, a resource management system, a printer, a printer network card and a resource management program, and a resource management method according to an aspect of the invention, as shown in FIG. 2, are applied to a case where a resource that a JAVA (registered trade mark) class set uses in an execution environment of a JAVA (registered trade mark) application is managed.

At the beginning, an outline of functions of a network printer 100 to which the invention is applied will be described.

Figure 1:
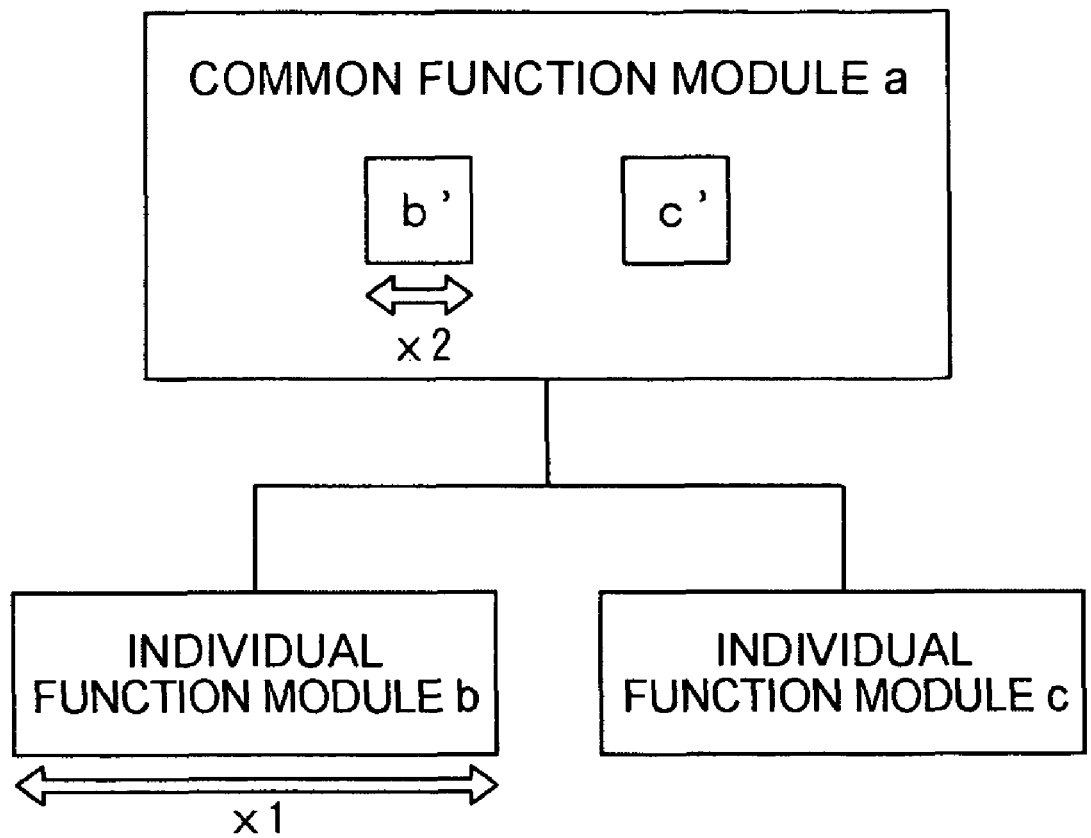
FIG. 1 is a diagram showing a configuration of the JAVA (registered trade mark) software.

FIG. 1 is a diagram showing a configuration of JAVA (registered trade mark) software.

In an execution environment of a JAVA (registered trade mark) application, a common function module that is made of a JAVA (registered trade mark) class that controls an execution of a JAVA (registered trade mark) class set and JVM is executed on an OS and an individual function module that is the JAVA (registered trade mark) class set is executed on the common function module. Here, the JAVA (registered trade mark) software is constituted of the common function module and the individual function module.

The common function module, as shown in FIG. 1, can execute a plurality of individual function modules. In an example shown in FIG. 1, a case where two individual function modules b and c are executed on a common function module a is shown. Here, when a volume of a resource that the individual function module b uses is represented with x1, a volume of a resource that the common function module a uses to execute the individual function module b is represented with x2 and the upper limit value of a resource that the individual function module b can use is represented with $X_{max}$, in the embodiment, a volume of a resource is limited so as to satisfy $x1+x2 \leq X_{max}$.

FIG. 2 is a functional block diagram showing an outline of functions of a network printer 100.

The network printer 100, as shown in FIG. 2, is constituted including an OS 110, a common function module 120 and a plurality of individual function modules 130.

The OS 110 is constituted including a resource measurement portion 10 that measures a volume of a resource that the JAVA (registered trade mark) software uses; and a resource limiter 12 that limits a volume of a resource that an entirety of the JAVA (registered trade mark) software uses.

The resource limiter 12 limits a resource that the JAVA (registered trade mark) software uses so that a volume of a resource measured at the resource measurement portion 10 may be less than a predetermined upper limit value assigned to the JAVA (registered trade mark) software.

The common function module 120 is constituted including; an individual function module management portion 14 that manages an execution of an individual function module 130; a resource measurement portion 16 that measures a volume of a resource that the individual function module management portion 14 and the individual function module 130 use; an upper limit value acquisition portion 18 that acquires an upper limit value of a resource that the individual function module 130 can use; and a resource limiter 20 that limits a volume of a resource that the individual function module management portion 14 and the individual function module 130 use.

The resource measurement portion 16 measures, for each of the individual function modules 130, a volume of a resource that an individual function module 130 uses and a volume of a resource that the individual function module management portion 14 uses to execute the individual function module 130.

The resource limiter 20 limits a volume of a resource that the individual function module 130 uses and a volume of a resource that the individual function module management portion 14 uses to execute the individual function module 130 so that a volume of a resource measured at the resource measurement portion 16 may be less than the upper limit value acquired at the upper limit acquisition portion 18.

Next, a configuration of a network printer 100 will be detailed.

Figures 3, 4:
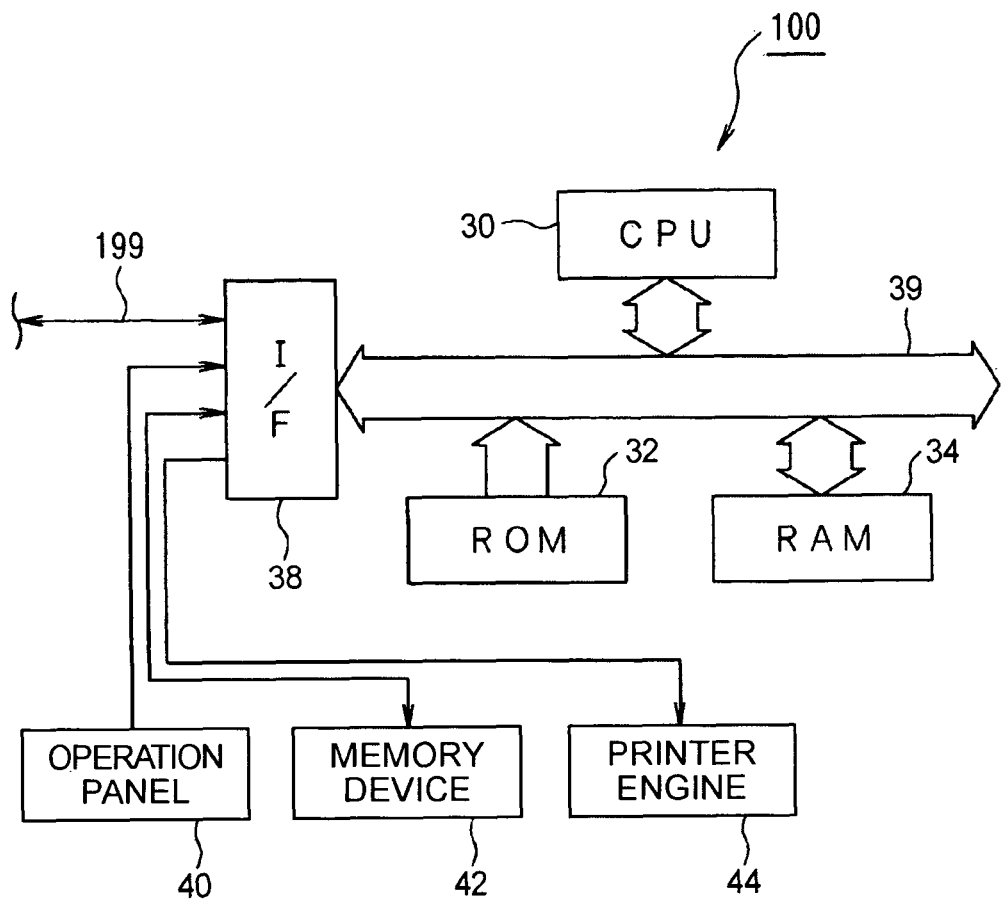
FIG. 3 is a block diagram showing a hardware configuration of the network printer 100.
FIG. 4 is a diagram showing a data structure of resource limiting information 400.

FIG. 3 is a block diagram showing a hardware configuration of the network printer 100.

The network printer 100, as shown in FIG. 3, includes: a CPU 30 that controls, based on a control program, a calculation and an entire system; a ROM 32 that stores a control program of the CPU 30 or the like in advance in a predetermined region; a RAM 34 that stores data read out of the ROM 32 and calculation results in the course of calculation of the CPU 30; and an I/F 38 that intermediates input/output of data to an external device, and these are mutually connected data receivable through a bus 39 that is a signal line for transmitting data.

To the I/F 38, as external devices, an operation panel 40 made of a touch panel or the like that can input and display data as a human interface; a memory device 42 that stores data and tables as files; a printer engine 44 constituted of units for printing such as a printer head, a head driver and others; and a signal line for connecting to a network 199 are connected.

Next, a data structure of the memory device 42 will be detailed.

The memory device 42 memorizes a common function module 120 and a plurality of individual function modules 130.

The individual function module 130 is constituted containing resource limiting information that stores an upper limit value of the resource.

FIG. 4 is a diagram showing a data structure of resource limiting information 400.

The resource limiting information 400, as shown in FIG. 4, is constituted including a field 402 that stores an upper limit value of a memory (RAM 34) that an individual function module 130 and a common function module 120 can use to execute the individual function module 130; and a field 404 that stores the number of classes that an individual function module 130 and a common function module 120 can start-up to execute the individual function module 130.

The individual function module 130 is constituted further including module information relating to the individual function module 130.

FIG. 5 is a diagram showing a data structure of module information 420.

The module information 420, as shown in FIG. 5, is constituted including a field 422 that stores whether a volume of a resource that the individual function module 130 uses is made a target that is limited (hereinafter, referred to as a resource management target) or not; a field 424 that stores models of network printers 100 that the individual function module 130 can execute; and a field 426 that stores electronic signature information.

In an example shown in FIG. 5, "effective" is stored in the field 422. This shows that the individual function module 130 is managed as a resource management target. Furthermore, the field 424 and the field 426, respectively, store "Type A" and "X Company". This shows that a model that the individual function module 130 can execute is "Type A" and an electronic signature of X Company is given.

The memory device 42 further memorizes an execution environment information registration table where execution environment information that shows an execution environment of the common function module 120 is registered.

FIG. 6 is a diagram showing a data structure of an execution environment information registration table 440.

The execution environment information registration table 440, as shown in FIG. 6, is constituted including a field 442 where an upper limit value of the number of individual function modules 130 that can be started is registered; a field 444 where a name of the individual function module 130 to be executed is registered; a field 446 where a name of the individual function module 130 to be eliminated is registered; a field 448 where a model of an own network printer 100 is registered; and a field 450 where accessible electronic signature information is registered.

In an example shown in FIG. 6, "5", "individual function modules b and d" and "individual function module c", respectively, are registered in the field 442, field 444 and the field 446. This shows that the individual function modules 130 can be started up to 5 at the maximum, and at the start of the common function module 120, the individual function modules b and d are executed and the individual function module c has to be eliminated. Furthermore, "Type A" and "X Company" are registered in the field 448 and the field 450, respectively. This shows that the own model is "Type A" and the individual function module 130 containing the electronic signature of X Company can be executed.

The memory device 42 further memorizes, for each of the individual function modules 130 that is a resource management target, a resource management table that manages a volume of a resource that the individual function module 130 uses. The resource management table is generated accompanying a start-up of the individual function module 130 when it is a resource management target.

Figure 7:
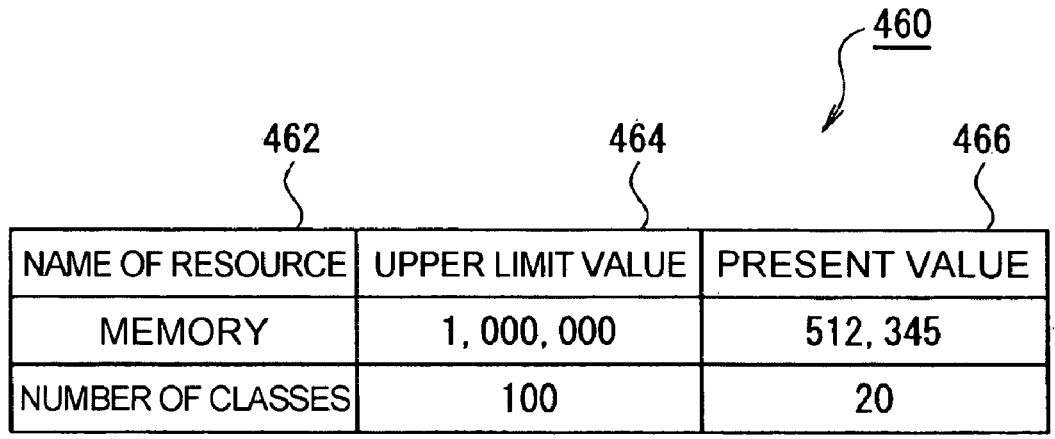
FIG. 7 is a diagram showing a data structure of a resource management table 460.

FIG. 7 is a diagram showing a data structure of a resource management table 460.

In the resource management table 460, as shown in FIG. 7, one record is registered for each of types of the resources. Each record is registered including a field 462 where a name of the resource is registered; a field 464 where an upper limit value of the resource that the individual function module 130 can use is registered; and a field 466 where a volume of the resource that the individual function module 130 is now using is registered.

In an example shown in FIG. 7, in a first stage record, "memory", "1000000" and "512345" are registered as a name of the resource, the upper limit value and a current value, respectively. This shows that the upper limit value of the memory that the individual function module 130 can use is 1000000 bytes and at present 512345 bytes of memory is used. Furthermore, in a second stage record, "the number of classes", "100" and "20" are registered as the name of the resource, the upper limit value and the current value, respectively. This shows that the upper limit value of the number of classes that the individual function module 130 can start is 100 and 20 classes are started at present.

The memory device 42 further memorizes an event listener table 480 where event listeners that process events received by the individual function module 130 are registered.

Figure 8:
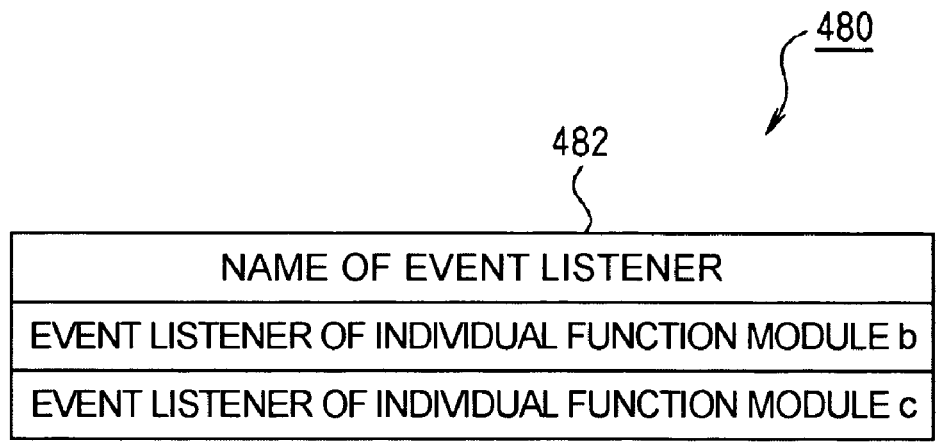
FIG. 8 is a diagram showing a data structure of an event listener table 480.

FIG. 8 is a diagram showing a data structure of an event listener table 480.

In the event listener table 480, as shown in FIG. 8, a record is registered for each of event listeners that the individual function module 130 registers. The respective records are registered including a field 482 where a name of an event listener is registered.

Returning to FIG. 3, a CPU 30 is made of a micro-processing unit and so on, starts a predetermined program stored in a predetermined region of the ROM 32, and, following the program, time-divisionally executes, respectively, an individual function module control process, a class read-in process, an event listener control process and an instance elimination process shown in flow charts of FIGS. 9, 13, 14 and 16 as a process of the common function module 120.

At the beginning, the individual function module control process will be detailed with reference to FIG. 9.

Figure 9:
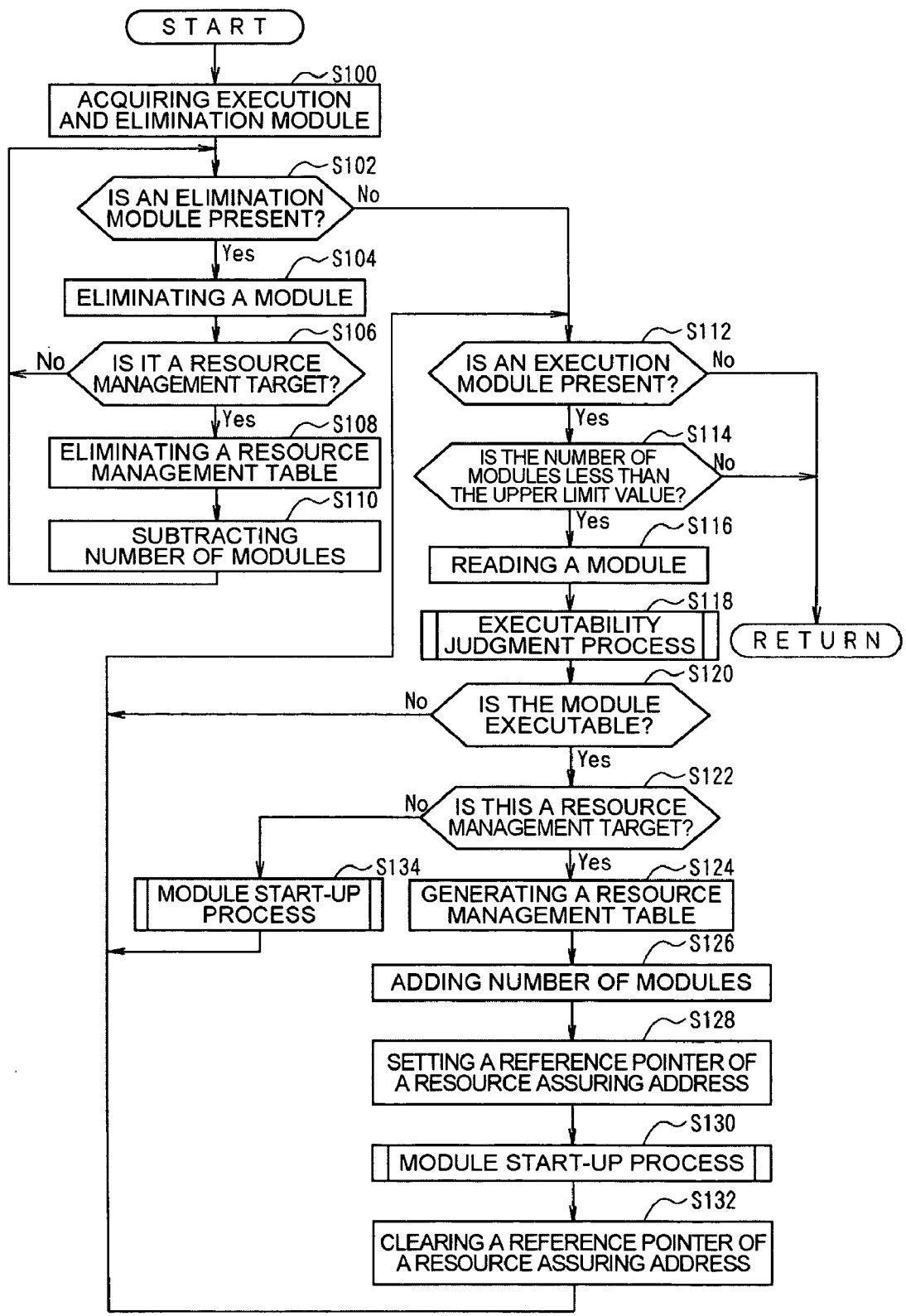
FIG. 9 is a flow chart showing an individual function module control process.

FIG. 9 is a flow chart showing the individual function module control process.

The individual function module control process is a process that controls the elimination and the execution of the individual function module 130. When it is executed in the CPU 30, as shown in FIG. 9, at the beginning, a step S100 is accessed.

In the step S100, a name of an individual function module 130 to be executed and a name of an individual function module 130 to be eliminated are acquired from the execution environment information registration table 440, the step goes to S102, whether an individual function module 130 to be eliminated is present or not is judged, and when an individual function module 130 to be eliminated is judged present (Yes), the step goes to S104.

In the step S104, based on the acquired name, the corresponding individual function module 130 is eliminated from the memory device 42, followed by advancing to step S106, there, based on module information 420 contained in the individual function module 130, whether the individual function module 130 is a resource management target or not is judged, when the individual function module 130 is judged the resource management target (Yes), the step advances to S108.

In the step S108, the resource management table 460 corresponding to the individual function module 130 is eliminated from the memory device 42, followed by advancing to step S110, "1" is subtracted from a value of a variable that shows the number of modules now in operation, further followed by advancing to the step S102.

On the other hand, in the step S106, when the individual function module 130 is judged not a resource management target (No), the step advances to step S102.

On the other hand, in the step S102, when an individual function module 130 to be eliminated is judged not present (No), the step advances to S112, there, whether there is an individual function module 130 to be executed or not is judged, when an individual function module 130 to be executed is judged present (Yes), the step advances to S114.

In the step S114, whether a value of a variable that shows the number of modules that are now being started is less than the predetermined upper limit value or not is judged, and, when it is judged less than the predetermined upper limit value (Yes), the step advances to S116.

In the step S116, based on the acquired name, the corresponding individual function module 130 is read from the memory device 42, followed by advancing to step S118, there, an executability judgment process that judges whether the read individual function module 130 is executable or not is carried out, followed by advancing to step S120.

In the step S120, whether a return value that shows a permission of the execution of the individual function module 130 is returned from the executability judgment process or not is judged, when the return value showing the permission of the execution is judged returned (Yes), the step advances to S122.

In the step S122, based on the module information 420 contained in the corresponding individual function module 130, whether the individual function module 130 is a resource management target or not is judged, when the individual function module 130 is judged the resource management target (Yes), the step advances to S124.

In the step S124, a resource management table 460 corresponding to the individual function module 130 is generated, the upper limit value is acquired from the resource limiting information 400 contained in the individual function module 130, the acquired upper limit value is registered in the generated resource management table 460, followed by advancing to step S126, there, "1" is added to a value of a variable that shows the number of modules that are now started, the step advances to S128.

In the step S128, an address of the generated resource management table 460 is set to a reference pointer of a resource assuring address, followed by advancing to step S130, there, a module start process is executed to start the individual function module 130, followed by advancing to step S132, the reference pointer of the resource assuring address is cleared, the step advances to S112.

On the other hand, in the step S122, when the individual function module 130 is judged not a resource management target (No), followed by advancing to step S134, a module start process similar to the step S130 is executed, the step advances to S112.

On the other hand, in the step S120, when the return value showing that the execution of the individual function module 130 is not permitted is judged returned from the executability judgment process (No), the step advances to S112.

On the other hand, when, in the step S114, a value of a variable showing the number of modules that are now started is judged a predetermined upper limit value or more (No), and when in the step S112 the individual function module 130 to be executed is judged not present (No), in both cases, a series of processes is brought to completion followed by returning to an initial process.

Next, an executability judgment process of the step S118 will be detailed with reference to FIG. 10.

Figure 10:
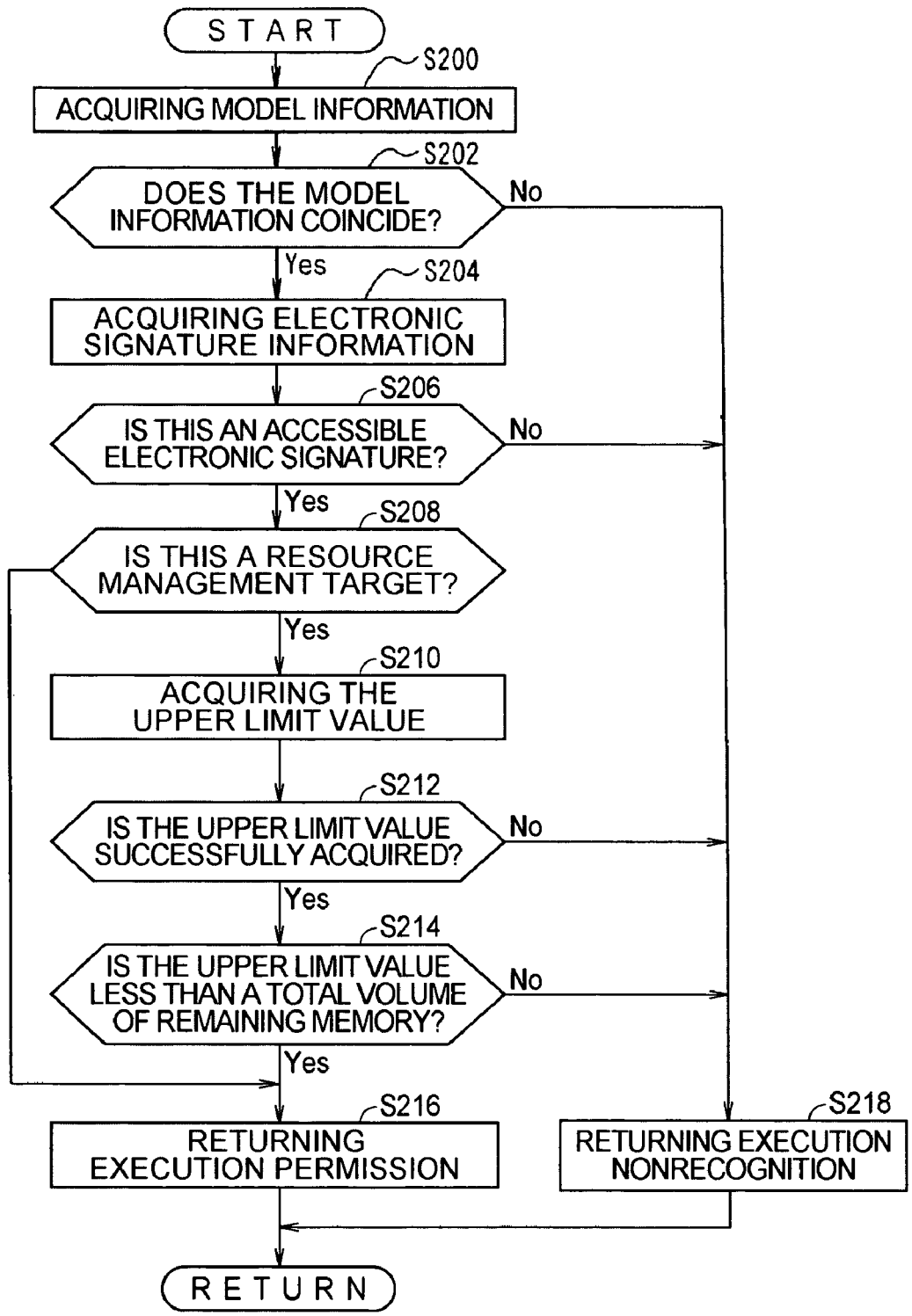
FIG. 10 is a flow chart showing an executability judgment process.

FIG. 10 is a flow chart showing the executability judgment process.

The executability judgment process, when executed in the step S118, as shown in FIG. 10, in the beginning, advances to step S200.

In the step S200, model information is acquired from the module information 420 contained in the individual function module 130, followed by advancing to step S202, there, whether the acquired model information and model information of the execution environment information registration table 440 coincide or not is judged, when the model information is judged coincided (Yes), the step advances to S204.

In the step S204, electronic signature information is acquired from the module information 420 contained in the individual function module 130, followed by advancing to step S206, there, based on the execution environment information registration table 440, whether the acquired electronic signature is accessible or not is judged, and when the electronic signature information is judged accessible (Yes), the step advances to S208.

In the step S208, based on the module information 420 contained in the individual function module 130, whether the individual function module 130 is a resource management target or not is judged, when it is judged a resource management target (Yes), the step advances to S210.

In the step S210, the upper limit value is acquired from the resource limiting information 400 contained in the individual function module 130, followed by advancing to step S212, there, whether the upper limit value can be successfully acquired or not is judged, and when the upper limit value is judged successfully acquired (Yes), the step moves to S214.

In the step 214, whether the acquired upper limit value is less than a volume of remaining memory that the common function module 120 can use or not is judged, and when it is judged less than a total volume of remaining memory (Yes), followed by advancing to step S216, there the return value that shows the permission of the execution of the individual function module 130 is returned, and thereby a series of processes comes to completion, followed by returning to an initial process.

On the other hand, in the step S208, when the individual function module 130 is judged not a resource management target (No), the step moves to S216.

On the other hand, in all cases when the acquired upper limit value is judged a total volume of remaining memory or more (No) in the step S214, when the upper limit value is judged failed in acquisition (No) in the step S212, when it is judged not accessible electronic signature information (No) in the step S206, and when the model information is judged not coincided (No) in the step S202, the step moves to S218, the return value that shows the execution of the individual function module 130 is not permitted is returned, and thereby a series of processes come to completion followed by returning to an initial process.

Subsequently, module start-up processes of steps S130 and S134 will be detailed with reference to FIG. 11.

Figure 11:
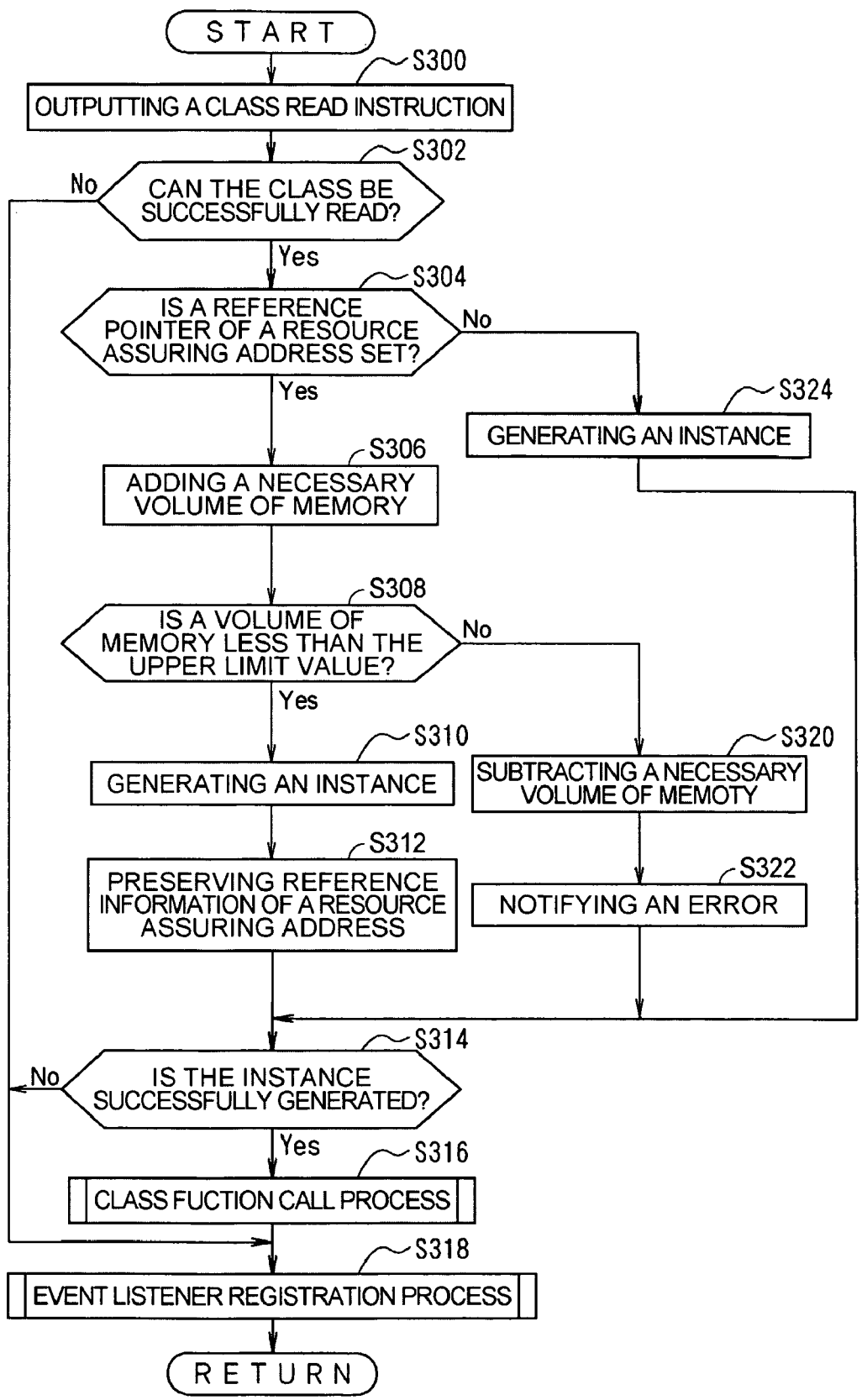
FIG. 11 is a flow chart showing a module start-up process.

FIG. 11 is a flow chart showing a module start-up process.

The module start-up process, when executed in the steps S130 and S134, as shown in FIG. 11, at the beginning, moves to step S300.

In the step S300, a class read instruction to read a class from the individual function module 130 is outputted, followed by moving to step S302 to judge whether the class is successfully read or not is judged, and, when the class is judged successfully read (Yes), the step moves to S304.

In the step S304, whether a reference pointer of a resource assuring address is set or not is judged, and, when the reference pointer of the resource assuring address is judged set (Yes), the step moves to S306.

In the step S306, a volume of memory for executing the read class is calculated, the calculated volume of memory is added to a volume of memory used of the resource management table 460 (hereinafter, referred to as reference resource management table 460) that the reference pointer of the resource assuring address indicates, followed by moving to step S308 to judge whether a total volume of memory after addition is less than the upper limit value of the reference resource management table 460 or not is judged, and, when it is judged less than the upper limit value (Yes), the step moves to S310.

In the step S310, an instance of the read class is generated on the memory, followed by moving to step S312, resource assuring address reference information that shows a value of the reference pointer of the resource assuring address is reserved in the generated instance, followed by moving to step S314.

In the step S314, whether the instance is successfully generated or not is judged, when the instance is judged successfully generated (Yes), the step moves to S316, a class function call process for calling a function of the read class is executed, followed by moving to step S318, an event listener registration process for registering an even listener of the individual function module 130 is executed, and thereby a series of processes comes to completion to return to an initial process.

On the other hand, when in the step S308 a total volume of memory is judged the upper limit value or more (No), followed by moving to step S320, a volume of memory calculated at the step S306 is subtracted from a volume of used memory of the reference resource management table 460, followed by moving to step S322, error is notified, followed by moving to step S314.

On the other hand, when, in the step S304, the reference pointer of the resource assuring address is judged not set (No), followed by moving to step S324, an instance of the read class is generated on the memory, followed by moving to step S314.

On the other hand, in both cases when in the step S314 the instance is judged unsuccessfully generated (No) and when in the step S302 the class is judged unsuccessfully read (No), the step moves to S318.

Next, the event listener registration process in the step S318 will be detailed with reference to FIG. 12.

Figure 12:
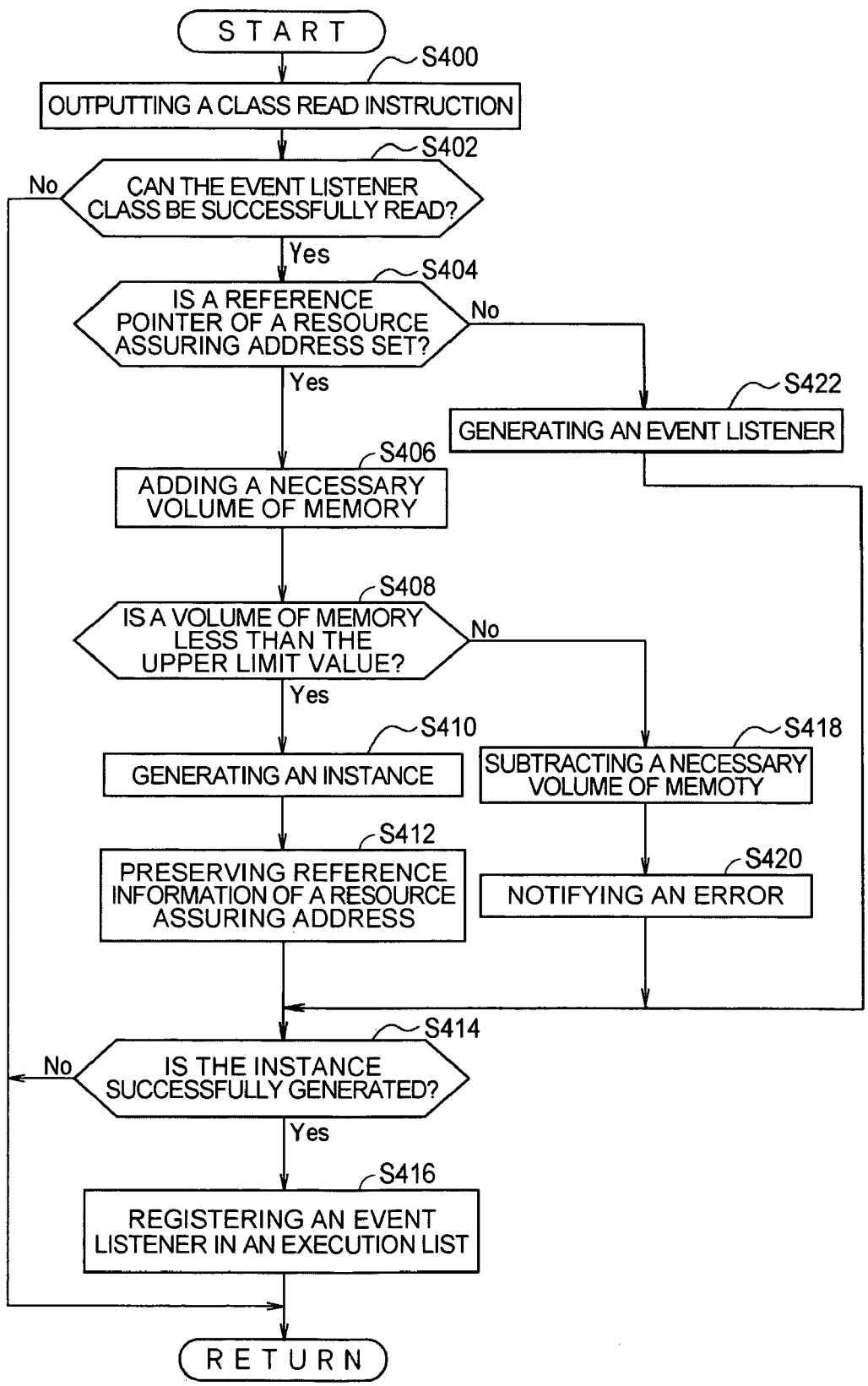
FIG. 12 is a flow chart showing an event listener registration process.

FIG. 12 is a flow chart showing an event listener registration process.

The event listener registration process, when executed in the step S318, as shown in FIG. 12, at the beginning, moves to step S400.

In the step S400, a class read instruction to read an event listener class from the individual function module 130 is outputted, followed by moving to step S402 to judge whether the event listener class is successfully read or not, and, when the event listener class is judged successfully read (Yes), the step moves to S404.

In the step S404, whether a reference pointer of a resource assuring address is set or not is judged, and, when the reference pointer of the resource assuring address is judged set (Yes), the step moves to S406.

In the step S406, a volume of memory for executing the read event listener class is calculated, the calculated volume of memory is added to a volume of used memory of the resource management table 460, followed by moving to step S408 to judge whether a total volume of memory after addition is less than the upper limit value of the reference resource management table 460 or not is judged, and, when it is judged less than the upper limit value (Yes), the step moves to S410.

In the step S410, an instance of the read event listener class is generated on the memory, followed by moving to step S412, resource assuring address reference information that shows a value of the reference pointer of the resource assuring address is reserved in the generated instance, followed by moving to step S414.

In the step S414, whether the instance is successfully generated or not is judged, when the instance is judged successfully generated (Yes), the step moves to S416, an event listener of the generated instance is registered in the event listener execution list, and thereby a series of processes comes to completion followed by returning to an initial process.

On the other hand, when in the step S408 a total volume of memory is judged the upper limit value or more (No), followed by moving to step S418, a volume of memory calculated at the step S406 is subtracted from a volume of used memory of the reference resource management table 460, followed by moving to step S420, error is notified, followed by moving to step S414.

On the other hand, when, in the step S404, the reference pointer of the resource assuring address is judged not set (No), followed by moving to step S422, an instance of the read event listener class is generated on the memory, followed by moving to step S414.

On the other hand, in both cases when in the step S414 the instance is judged unsuccessfully generated (No) and when in the step S402 the event listener class is judged unsuccessfully read (No), a series of processes come to completion followed by returning to an initial process.

Next, a class read process will be detailed with reference to FIG. 13.

Figure 13:
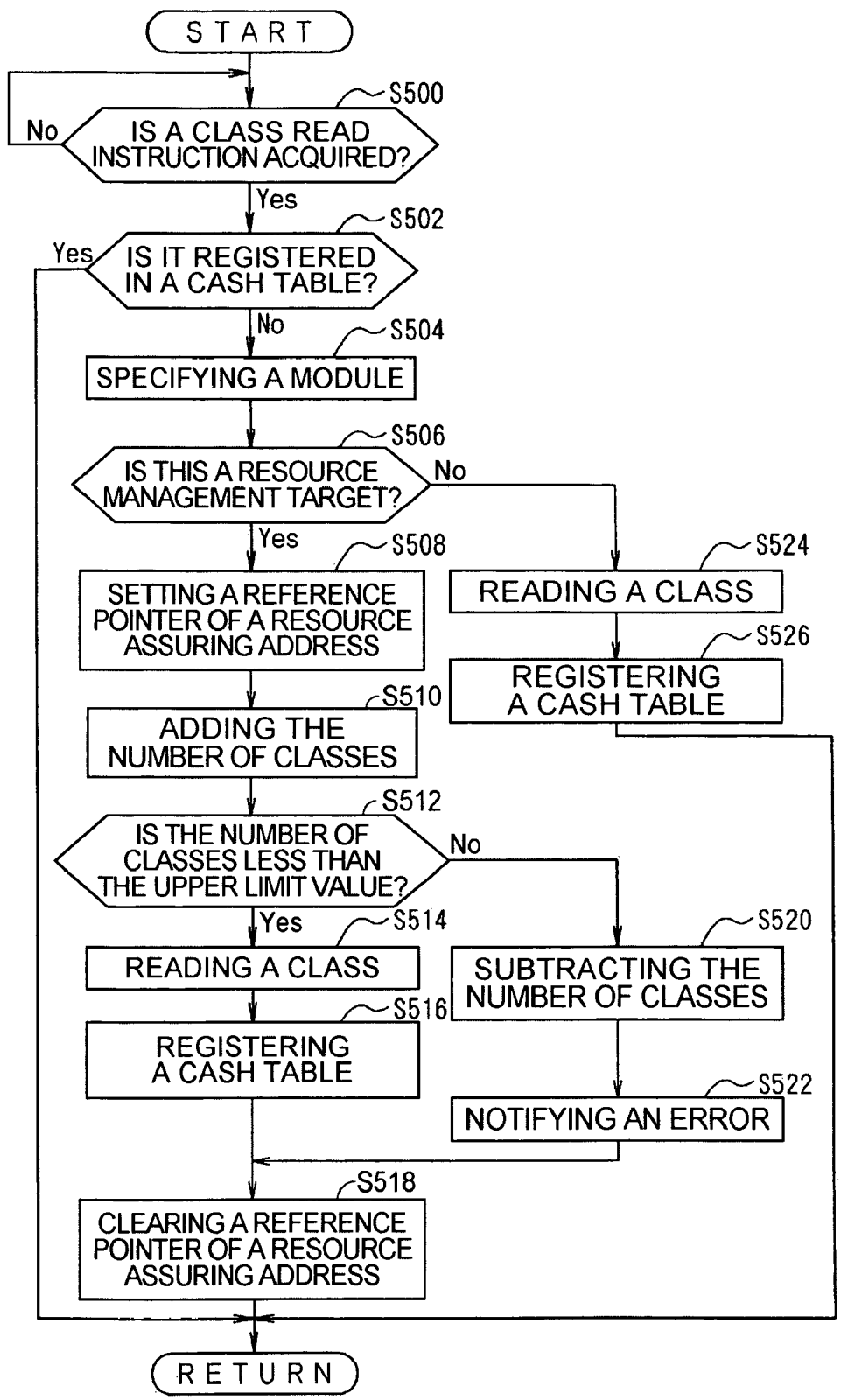
FIG. 13 is a flow chart showing a class read process.

FIG. 13 is a flow chart showing the class read process.

The class read process is a process that reads a class in accordance with the class read instruction and, when it is executed on the CPU 30, as shown in FIG. 13, in the beginning, the step moves to S500.

In the step S500, whether the class read instruction is acquired or not is judged, when the class read instruction is judged acquired (Yes), step moves to S502, however, when it is judged not acquired (No), the process waits at step S500 until the class read instruction is acquired.

In the step S502, whether a class involving the class read instruction is registered in a cash table or not is judged, when it is judged not registered in the cash table (No), the step moves to S504.

In the step S504, an individual function module 130 to which the class involving the class read instruction belongs is specified, the process moves to step S506, based on the module information 420 contained in the specified individual function module 130, whether the individual function module 130 is a resource management target or not is judged, when it is judged a resource management target (Yes), the step moves to S508.

In the step S508, an address of the resource management table 460 corresponding to the individual function module 130 is set to a reference pointer of a resource assuring address and the step moves to S510.

In the step S510, "1" is added to the number of start-up classes of the reference resource management table 460, the step moves to S512, whether a total number of classes after addition is less than the upper limit value of the reference resource management table 460 or not is judged, when it is judged less than the upper limit value (Yes), the step moves to S514.

In the step S514, a class involving the class read instruction is read from the individual function module 130, the step moves to S516, the read class is registered in the cash table, the step moves to S518, a reference pointer of the resource assuring address is cleared, thereby a series of processes come to completion followed by returning to an initial process.

On the other hand, in the step S512, when the total number of classes after addition is judged the upper limit value or more (No), the step moves to S520, "1" is subtracted from the number of start-up classes of the reference resource management table 460, the process moves to step S522, an error is notified, and the step moves to S518.

On the other hand, in the step S506, when the individual function module 130 is judged not a resource management target (No), the step moves to S524, a class involving the class read instruction is read from the individual function module 130, the step moves to S526, the read class is registered in the cash table, thereby a series of processes come to completion followed by returning to an initial process.

On the other hand, in the step S502, when the class involving the class read instruction is judged registered in the cash table (Yes), a series of processes come to completion followed by returning to an initial process.

Next, an event listener control process will be detailed with reference to FIG. 14.

Figure 14:
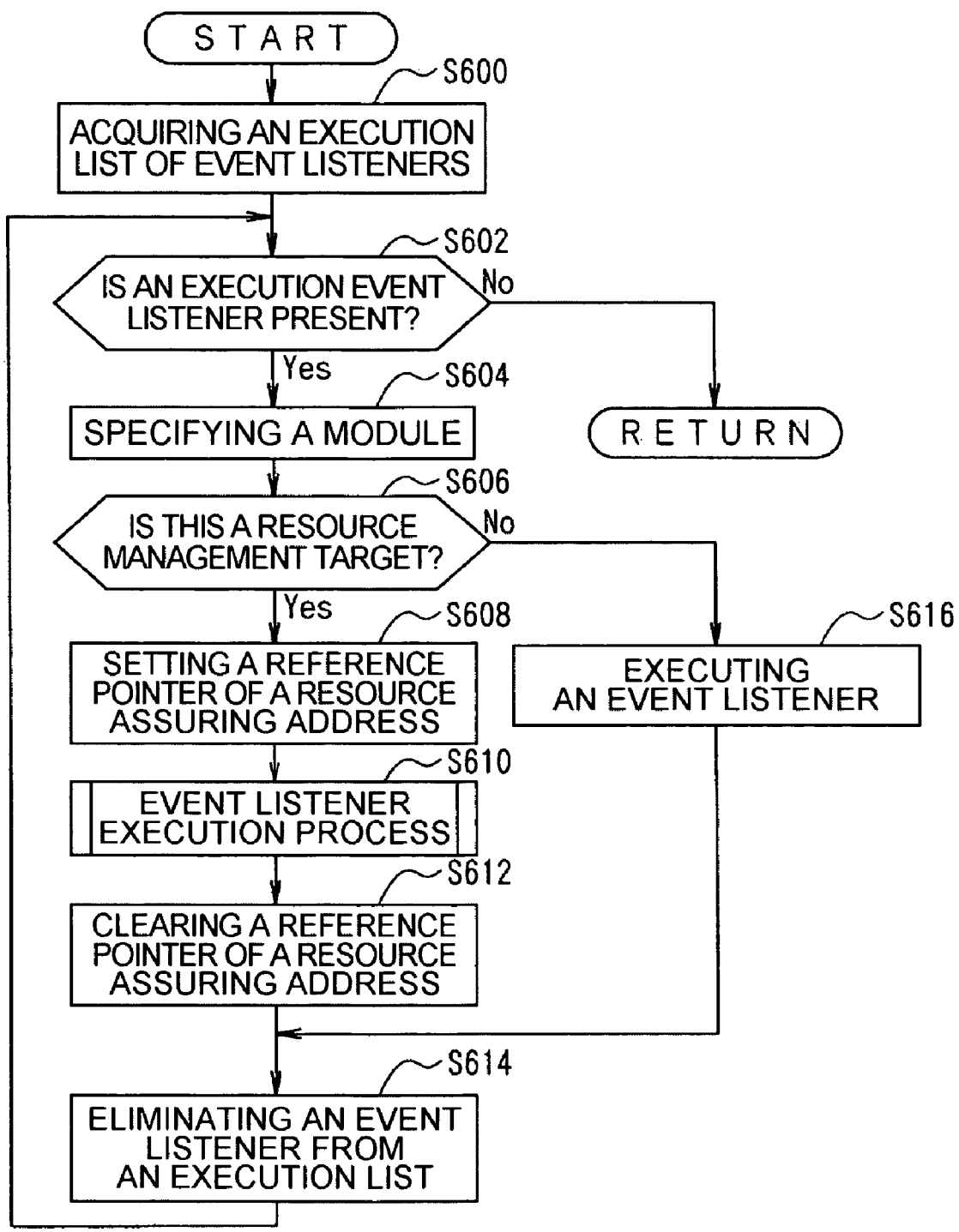
FIG. 14 is a flow chart showing an event listener control process.

FIG. 14 is a flow chart showing the event listener control process.

The event listener control process is a process that controls the execution of an event listener and, when it is executed on the CPU 30, as shown in FIG. 14, in the beginning, the step moves to S600.

In the step S600, an event listener execution list is acquired, the step moves to S602, based on the acquired event listener execution list, whether an event listener to be executed is present or not is judged, and when the event listener to be executed is judged present (Yes), the step moves to S604.

In the step S604, an individual function module 130 that is a generator of the event listener is specified, the step moves to S606, based on module information 420 contained in the specified individual function module 130, whether the individual function module 130 is a resource management target or not is judged, when it is judged the resource management target (Yes), the step moves to S608.

In the step S608, an address of a resource management table 460 corresponding to the individual function module 130 is set to a reference pointer of a resource assuring address, the step moves to S610, an event listener execution process that executes the event listener is executed, followed by moving to step S612, the reference pointer of the resource assuring address is cleared, and the step moves to S614.

In the step S614, the event listener is eliminated from the event listener execution list, and the step moves to S602.

On the other hand, in the step S606, when the individual function module 130 is judged not a resource management target (No), the step moves to S616, the event listener is executed, followed by moving to step S614.

On the other hand, when in the step S602 an event listener to be executed is judged not present (No), a series of processes come to completion followed by returning to an initial process.

Next, an event listener execution process according to step S610 will be detailed with reference to FIG. 15.

Figure 15:
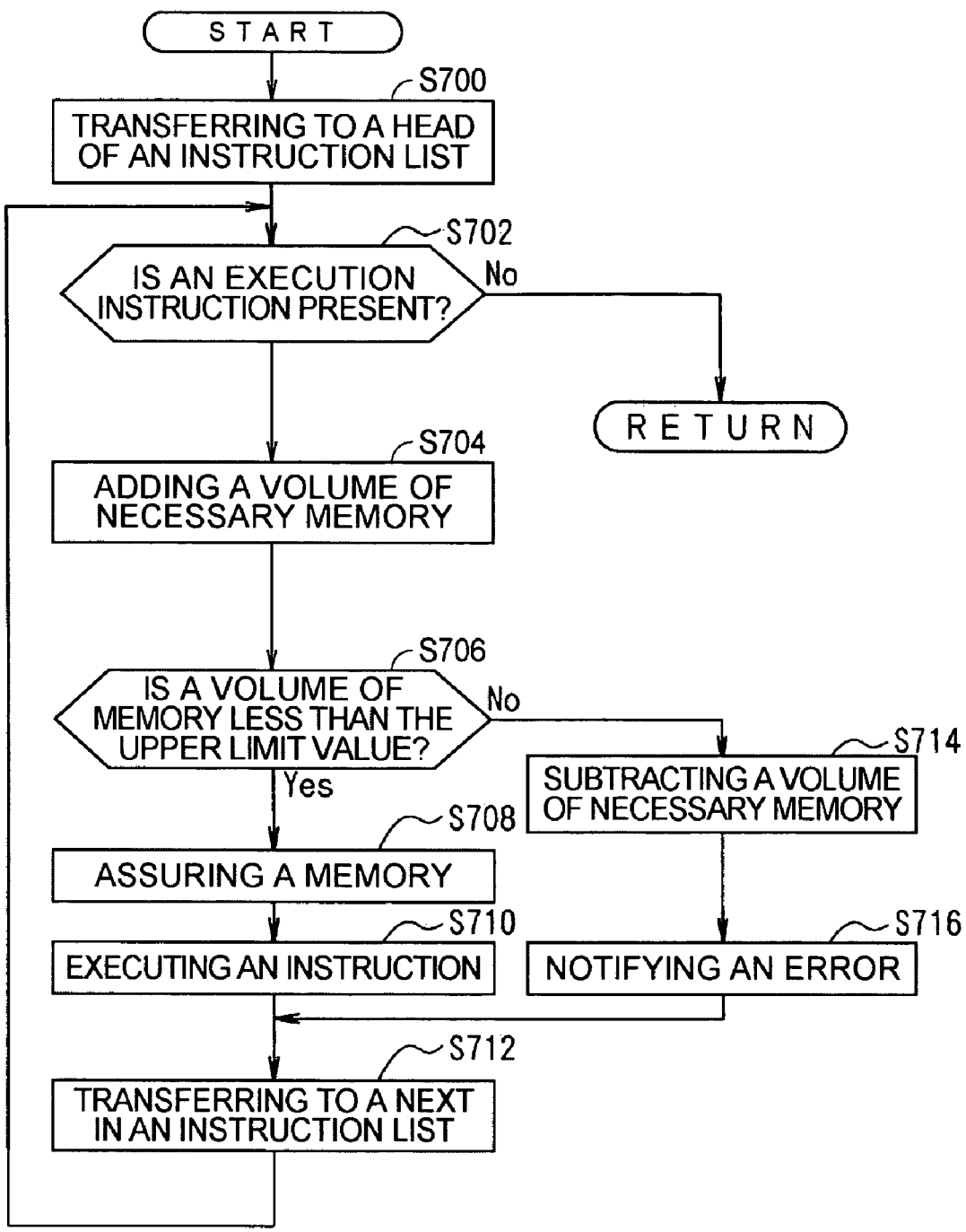
FIG. 15 is a flow chart showing an event listener execution process.

FIG. 15 is a flow chart showing the event listener execution process.

The event listener execution process, when it is executed in the step S610, as shown in FIG. 15, in the beginning, moves to step S700.

In the step S700, at a head of an instruction list contained in the event listener, a program pointer is moved, the step moves to S702, whether an instruction to be executed is present in an address indicated with the program pointer or not is judged, when the instruction to be executed is judged present (Yes), the step moves to S704.

In the step S704, a volume of memory for executing an instruction is calculated, a volume of calculated memory is added to a volume of memory used of the reference resource management table 460, the step moves to S706, whether a total volume of memory after addition is less than the upper limit value of the reference resource management table 460 or not is judged, when it is judged less than the upper limit value (Yes), the step moves to S708.

In the step S708, memory is secured, followed by moving to step S710, an instruction of an address indicated with a program pointer is executed, followed by moving to step S712, the program pointer is moved to next one in the instruction list contained in the event listener, and the step moves to S702.

On the other hand, when in the step S706 a total volume of memory is judged the upper limit value or more (No), followed by moving to step S714, a volume of memory calculated at the step S704 is subtracted from a volume of used memory of the reference resource management table 460, followed by moving to step S716, error is notified, followed by moving to step S712.

On the other hand, when, in the step S702, the instruction to be executed is judged not present (No), a series of processes come to completion followed by returning to an initial process.

Then, an instance elimination process will be detailed with reference to FIG. 16.

Figure 16:
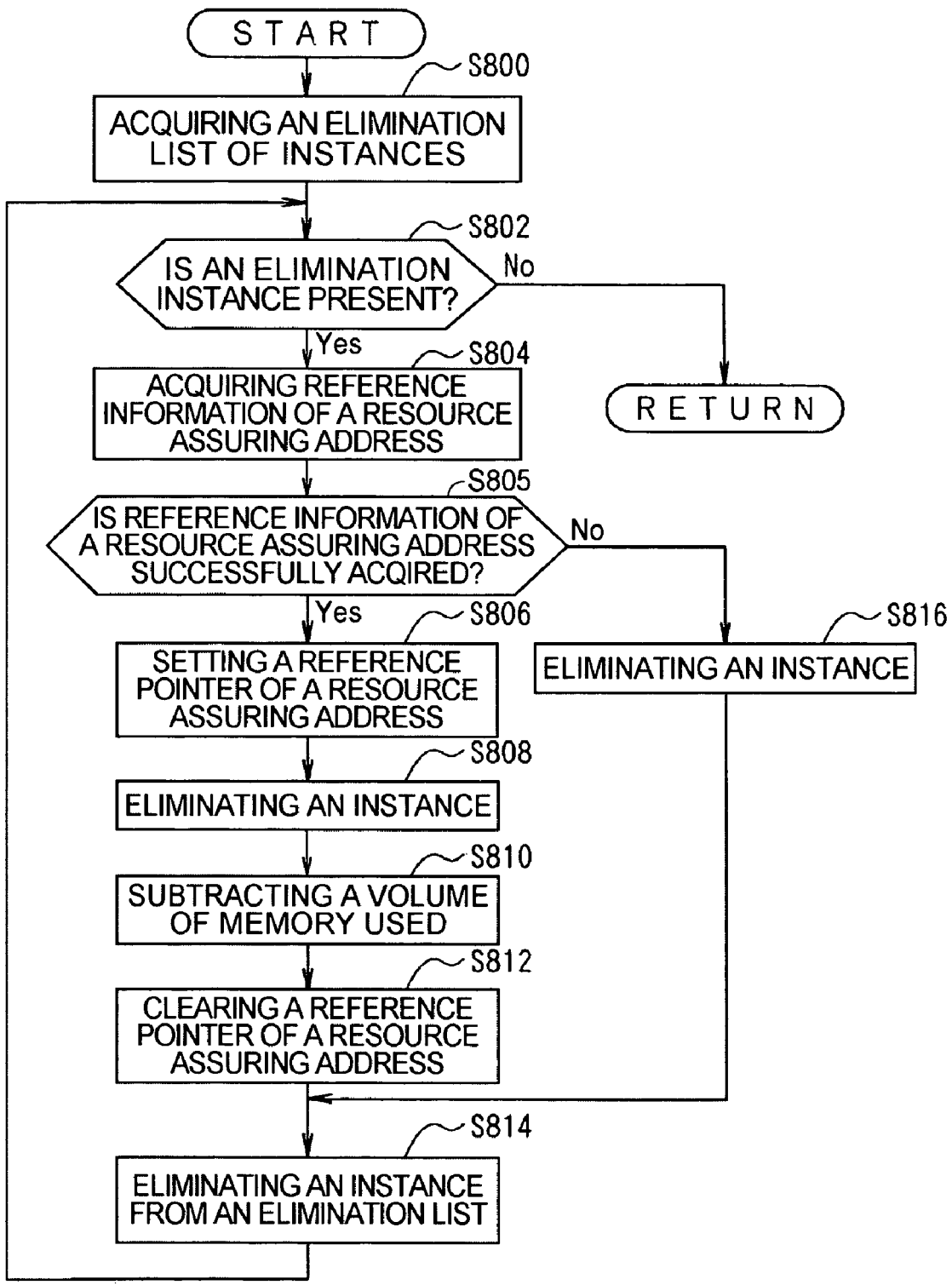
FIG. 16 is a flow chart showing an event listener elimination process.

FIG. 16 is a flow chart showing the instance elimination process.

The instance elimination process is a process to eliminate an instance and, when it is executed on the CPU 30, as shown in FIG. 16, in the beginning, moves to step S800.

In the step S800, an instance elimination list where an instance to be eliminated is registered is acquired, the step moves to S802, based on the acquired instance elimination list, whether an instance to be eliminated is present or not is judged, and, when the instance to be eliminated is judged present (Yes), the step moves to S804.

In the step S804, resource assuring address reference information is acquired from the instance, the step moves to S805, whether the resource assuring address reference information is successfully acquired or not is judged, when the resource assuring address reference information is judged successfully acquired (Yes), the step moves to S806.

In the step S806, based on the acquired resource assuring address reference information, a reference pointer of the resource assuring address is set, the step moves to S808, the instance is eliminated, followed by moving to step S810, a volume of memory for executing the instance is subtracted from a volume of used memory of the reference resource management table 460, the step moves to S812.

In the step S812, the reference pointer of the resource assuring address is cleared, the step moves to S814, the instance is eliminated from the instance elimination list, followed by moving to step S802.

On the other hand, in the step S805, when the resource assuring address reference information is judged not successfully acquired (No), the step moves to S816, the instance is eliminated, followed by moving to S814.

On the other hand, when in the step S802 the instance to be eliminated is judged not present (No), a series of processes come to completion followed by returning to an initial process.

Next, an operation of the embodiment will be explained.

In the beginning, a case where an individual function module 130 that becomes a resource management target is executed will be explained.

In a network printer 100, a common function module 120 is executed to execute an individual function module control process. In the individual function module control process, through steps S102 through S110, when an individual function module 130 to be eliminated is present, the individual function module 130 is eliminated. Next, through step S114, when the number of modules that are now started is judged less than a predetermined upper limit value, through steps S116 and S118, the individual function module 130 is read, and whether the read individual function module 130 can be executed or not is judged. In an executability judgment process, when the individual function module 130 has coincident model information and accessible electronic signature information and the upper limit value of usable memory is less than a total volume of remaining memory, the execution is permitted.

When an individual function module 130 is permitted to execute, through steps 124 through S128, a resource management table 460 is generated, "1" is added to the number of running modules, and the individual function module 130 is started. In a module start-up process, through steps S510 and S306, the number of start-up classes of the individual function module 130 and a volume of memory used are added. At this time, when any one of the number of start-up classes and a volume of memory used becomes the upper limit value or more, through step S522 or S322, an error is notified, class read or instance generation is stopped.

On the other hand, both of the number of start-up classes and a volume of memory used are less than the upper limit value, through steps S514, S310 and S318, a class of the individual function module 130 is read, an instance of the read class is generated, and an event listener of the individual function module 130 is registered. In an event listener registration process, through steps S510 and S406, the number of start-up classes of the individual function module 130 and a volume of memory used are added. At this time, when any one of the number of start-up classes and a volume of memory used becomes the upper limit value or more, through step S522 or S420, an error is notified and event listener class read or instance generation is stopped.

On the contrary, both of the number of start-up classes and a volume of memory used are less than the upper limit value, through steps S514, S410 and S416, an event listener class is read, an instance of the event listener class is generated, and the event listener of the generated instance is registered in the event listener execution list.

On the other hand, in the network printer 100, the common function module 120 is executed to execute an event listener control process. In the event listener control process, through step S704, a volume of memory used by the individual function module 130 that becomes a generator of the event listener to be executed is added. At this time, when a volume of memory used becomes the upper limit value or more, through step S716, an error is notified and the event listener is stopped executing.

On the contrary, when a volume of memory used is less than the upper limit value, through step S710, an instruction contained in the event listener is executed.

On the other hand, in the network printer 100, a common function module 120 is executed to execute an instance elimination process. In the instance elimination process, when an instance to be eliminated is present, through steps S808 and S810, the instance is eliminated, and a volume of memory used in the individual function module 130 that is a generator of the event listener is subtracted.

Next, a case where an individual function module 130 that is not a resource management target is executed will be described.

In the network printer 100, when an individual function module control process is executed, through steps S116 and S118, a corresponding individual function module 130 is read, and the executability of the read individual function module 130 is judged.

When the individual function module 130 is permitted to execute, through step S134, the individual function module 130 is started. In a module start-up process, through steps S524, S324 and S318, a class of the individual function module 130 is read, an instance of the read class is generated, and an event listener of the individual function module 130 is registered. In an event listener registration process, through S524, S422 and S416, an event listener class is read, an instance of the event listener class is generated, and an event listener of the generated instance is registered in an event listener execution list.

On the other hand, in the network printer 100, when an event listener control process is executed, through step S616, an instruction contained in the event listener to be executed is executed.

On the other hand, in the network printer 100, when an instance elimination process is executed, in the case of an instance to be eliminated being present, through step S816, the instance is eliminated.

Figure 17:
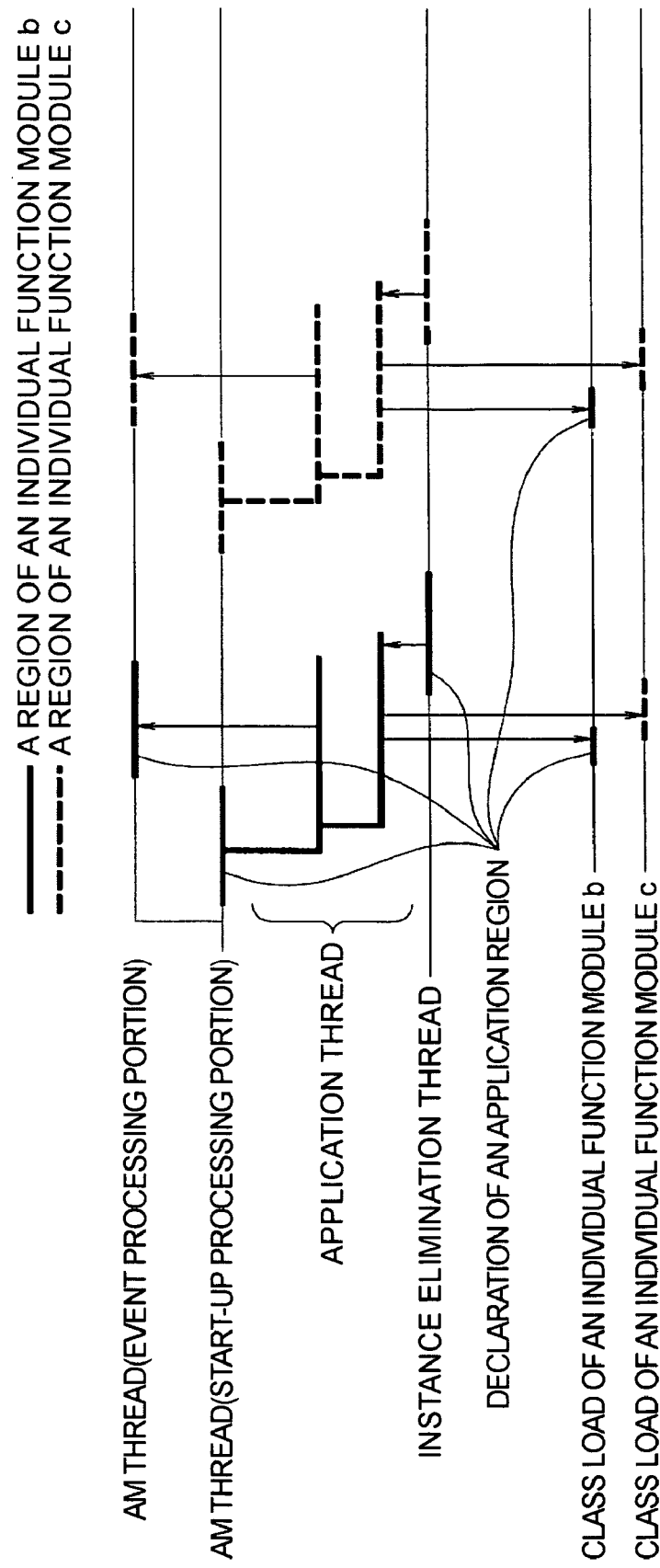
FIG. 17 is a time chart showing a case where individual function modules b and c that are targets of resource management are executed in parallel.
Figure 18B:
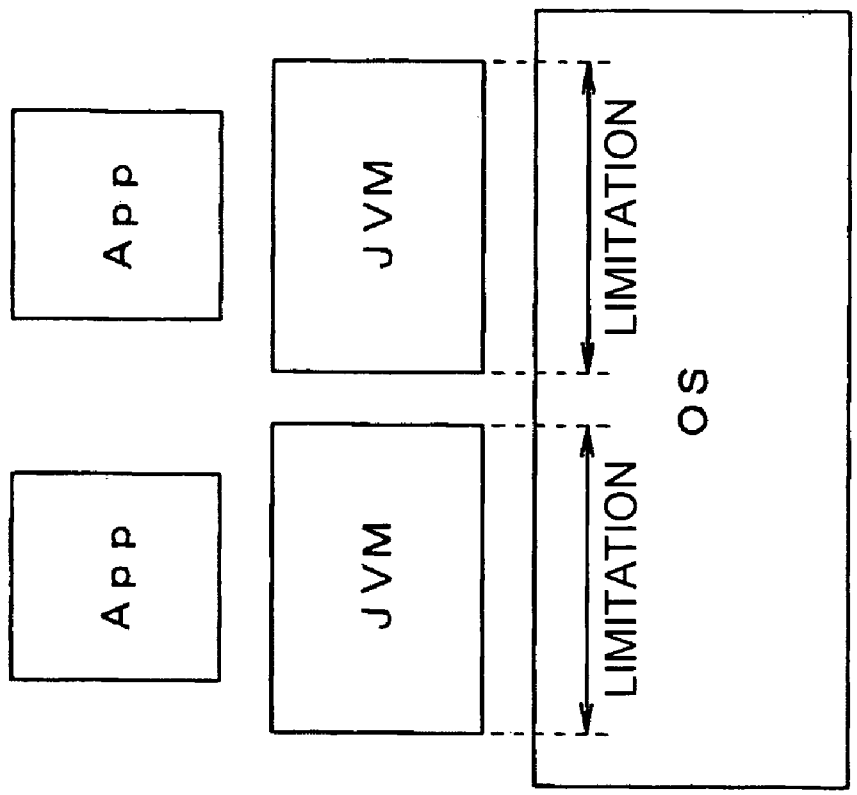
FIGS. 18A and 18B are diagrams for explaining an execution environment of a JAVA (registered trade mark) application.
Figure 18A:
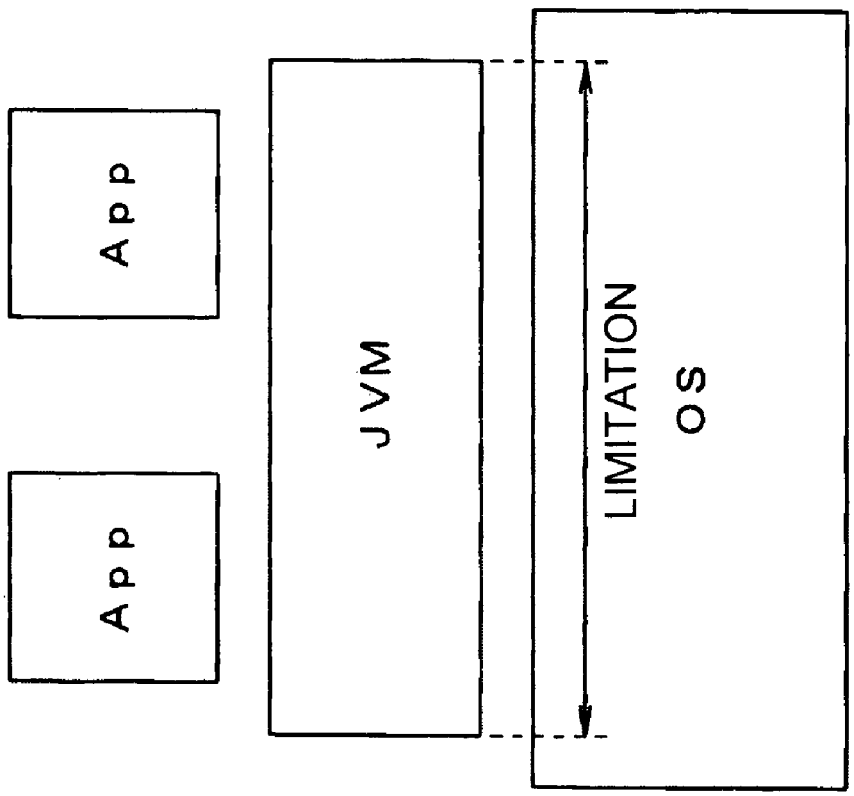

FIG. 17 is a time chart showing a case when individual function modules b and c that are resource management targets are executed in parallel.

In FIG. 17, solid lines show ones that are used in the execution of the individual function module b of a thread of the individual function module b and a thread of a common function module 120. Furthermore, dotted lines show ones that are used to execute the individual function module c of a thread of the individual function module c and a thread of a common function module 120.

When the individual function module b is executed, an AM thread (start-up processor) of the common function module 120 is executed and the individual function module b is started to execute the thread thereof. Furthermore, an AM thread of the common function module 120 is executed and thereby an event listener of the individual function module b is generated. When an event corresponding to the individual function module b is generated the AM thread (event processor) of the common function module 120 is executed, a class of the individual function module b is read, and read instance is generated. When the individual function module b becomes unnecessary, an instance elimination thread of the common function module 120 is executed, and thereby the instance of the individual function module b is eliminated. In a series of processes, the number of start-up classes and a volume of memory used that rise and fall accompanying the execution of the common function module 120 and the individual function module b are managed as a volume of a resource that the individual function module b uses and limited so as to be less than the predetermined upper limit value set to the individual function module b.

The operation is same as to that of the individual function module c. However, in a series of processes, the number of start-up classes and a volume of memory used that rise and fall accompanying the execution of the common function module 120 and the individual function module c are managed as a volume of a resource that the individual function module c uses and limited so as to be less than the predetermined upper limit value set to the individual function module c.

A class resource (the number of classes and size thereof) in the embodiment is assigned to a function module that supplies the class. Accordingly, when the class that the function module b has is read and utilized, irrespective of the thread that is used being either one of the function module b and the function module c, it becomes that the function module b consumes the class resource. Accordingly, in FIG. 17, resource consumption in the thread of a class load of the individual function module b is only broad solid lines showing regions of the function module b. Furthermore, resource consumption in the thread of a class load of the individual function module c is only broad broken lines showing regions of the function module c.

Accordingly, a function module specified in step S504 is not an individual function module that reads a class but an individual function module that provides a class. In processes after that, a resource is assigned to a specified individual function module.

Thus, a resource that is consumed in the thread of a certain individual function module 130 is assigned to any one of the common function module, own individual function module 130 and other individual function module 130.

Thus, in the embodiment, a volume of a resource that an entirety of the JAVA (registered trade mark) software uses is limited, resource limiting information 400 is acquired from the individual function module 130, and, based on the acquired resource limiting information 400, a volume of memory that the individual function module 130 uses is limited.

Thereby, on the basis of the JAVA (registered trade mark) software as a whole a volume of the resource can be limited and on the basis of the individual function module 130 a volume of memory can be limited; accordingly, more than ever, in an execution environment of the JAVA (registered trade mark) application, the likelihood of becoming instable in the operation of software due to deficiency of resource can be reduced. Furthermore, a volume of memory is limited on the basis of the individual function module 130; accordingly, there is no need of executing a plurality of common function modules 120, resulting in more than ever suppressing an increase in a volume of resource used.

Furthermore, in the embodiment, for each of the individual function modules 130 that become a resource management target, a volume of memory that the individual function module 130 uses, and a volume of memory that the common function module 120 uses to execute the individual function module 130 and the number of classes that are started are limited.

Thereby, a volume of memory that the common function module 120 uses and the number of classes that the common function module 120 starts-up can be limited on the basis of the individual function module 130; accordingly, in an execution environment of the JAVA (registered trade mark) application, the likelihood of becoming instable in the operation of software due to deficiency of resource can be further reduced.

In the first embodiment, the resource limiter 12 corresponds to the first resource limiting unit according to mode 1 or 6, the upper limit value acquisition portion 18 and the step S124 correspond the resource limiting information acquisition unit according to mode 1, 3, 6 or 8, and the step S124 corresponds to the resource limiting information acquisition step according to mode 16, 18, 21, 22, 24 or 25. Furthermore, the resource limiter 20 and steps S214, S218, S120, S306, S308, S406, S408, S510, S512, S704 and S706 correspond to the second resource limiting unit according to mode 1, 2, 6 or 7, or the resource limiting unit according to mode 3, 4, 8 or 9.

Furthermore, in the first embodiment, steps S214, S218, S120, S306, S308, S406, S408, S510, S512, S704 and S706 correspond to the second resource limiting steps according to modes 16, 17, and 21 through 23, or the resource limiting steps according to modes 16, 18, 19, 21, 22 and 24 through 26. Still furthermore, the common function module 120 corresponds to the first function modules according to modes 1 through 10 and 16 through 27, and the individual function module 130 corresponds to the second function modules according to modes 1 through 10 and 16 through 27.

Next, a second embodiment according to an aspect of the invention will be described.

The difference of the embodiment from the first embodiment is in that only a volume of a resource that a common function module 120 uses to execute an individual function module 130 is limited.

In this case, in the event listener registration process shown in FIG. 12, processes according to steps S404, S406, S408, S410, S412, S418 and S420 are not executed.

The event listener registration process shown in FIG. 12 is a thread that the individual function module 130 executes, and specifically an event listener is registered. Not a resource that the individual function module 130 uses, only a resource that a common function module 120 uses when the individual function module 130 is executed is measured; accordingly, processes in the respective steps become unnecessary.

The event listener registration process shown in FIG. 12 corresponds to the event listener registration process (S318) in FIG. 11. However, a portion that secures a resource when the individual function module 130 is executed in addition to FIG. 12 becomes a class function call process (S316). The class function call process can be constituted according to a procedure similar to that of the event listener execution process shown in FIG. 15. When constituted like in FIG. 15, in the embodiment, processes corresponding to steps S704, S706, S708, S714 and S716 are not executed.

Thereby, a volume of a resource that the common function module 120 uses can be limited on the basis of an individual function module 130; accordingly, more than ever, the likelihood of a software operation becoming instable due to the deficiency of the resource can be reduced. Furthermore, since a volume of a resource is limited on the basis of the individual function module 130, a plurality of common function modules 120 can be done without executing, more than ever, a volume of a resource can be inhibited from increasing.

In the second embodiment, the upper limit value acquisition portion 18 and the step S124 correspond the resource limiting information acquisition unit according to mode 3 or 8, the step S124 corresponds to the resource limiting information acquisition step according to mode 18, 24 or 25, and the resource limiter 20 and steps S214, S218, S120, S306, S308, S510, S512, S704 and S706 correspond to the resource limiting unit according to mode 3, 4, 8 or 9. Furthermore, steps S214, S218, S120, S306, S308, S510, S512, S704 and S706 correspond to the resource limiting steps according to modes 18, 19 and 24 through 26, and the common function module 120 corresponds to the first function modules according to modes 3 through 5, 8 through 10, 18 through 20 and 24 through 27.

Still furthermore, in the second embodiment, the individual function module 130 corresponds to the second function modules according to modes 3 through 5, 8 through 10, 18 through 20 and 24 through 27.

In the first and second embodiments, a function made of the resource measurement unit 10, the resource limiter 12, the resource measurement unit 16, the upper limit value acquisition unit 18 and the resource limiter 20 is constituted so as to realize as an internal function of the network printer 100. However, without being restricted thereto, the foregoing function may be constituted as well so as to realize as a function of a network card that is installed to the network printer 100.

In this case, the resource limiter 12 corresponds to the first resource limiting unit according to mode 11, the upper limit value acquisition portion 18 and the step S124 correspond to the resource limiting information acquisition unit according to mode 11 or 13, and the resource limiting unit 20 and the steps S124, S218, S120, S306, S308, S406, S408, S510, S512, S704 and S706 correspond to the second resource limiting unit according to mode 11 or 12, or the resource limiting unit according to mode 13 or 14. Furthermore, the common function module 120 corresponds to the first function modules according to modes 11 through 15, and the individual function module 130 corresponds to the second function modules 130 according to modes 11 through 15.

Furthermore, in the first and second embodiments, as a volume of a resource, a volume of memory used and the number of start-up classes are limited. However, without being restricted thereto, the number of socket connections, the number of file connections, the number of files, capacities of files, sizes of classes, capacities of ZIP memories, a volume of CPU used, a volume of socket communications and a volume of file writing and reading may be limited Still furthermore, in the first and second embodiments, in all when processes in flowcharts shown in FIGS. 9 through 16 are executed, a case where a control program stored in advance in the ROM 32 is executed is described. However, without being restricted thereto, after the program is read in the RAM 34 from a memory medium where a program showing the procedure is memorized, it may be executed.

Here, the memory media mean semiconductor memory media such as RAM, ROM and so on, magnetic memory media such as FD, HD and so on, optical reading type memory media such as CD, CDV, LD, DVD and so on and magnetic/optical reading memory media such as MO and so on, and, irrespective of electronic, magnetic and optical reading methods, as far as the memory medium can be read with a computer, all memory media are contained.

Furthermore, in the first and second embodiments, the resource management system, the printer, the printer network card and resource management program, and the resource management method according to an aspect of the invention are applied, as shown in FIG. 2, to a case where a resource that the JAVA (registered trade mark) class set uses in an execution environment of the JAVA (registered trade mark) application is managed. However, without being restricted thereto, within a range that does not deviated from a gist of the invention, these can be applied to other cases as well. In place of the network printer 100, these can be applied also to, for instance, a projector, a scanner, an electronic paper, a home gateway, a personal computer, a PDA (Personal Digital Assistant), a network storage, an audio device, a portable telephone, a PHS (registered trade mark) (Personal Handy phone System), a watch, type PDA, a STB (Set Top Box), a POS (Point Of Sale) terminal, a FAX machine, a telephone (including IP telephone), a digital TV and other devices.

What is claimed is:

1. A resource management system, including a network printer having a processor, that manages resources used by a single common function module to execute a plurality of individual function modules, the resource management system comprising:

a first resource limiting unit, included within an operating system that executes the single common function module, that limits use of the resources by an entirety of the single common function module and the plurality of individual function modules;

a resource limiting information acquisition unit, included within the single common function module, that receives resource limiting information from the first resource limiting unit that shows a plurality of limiting conditions of the resources, the limiting conditions including limits on each of: a total volume of at least one of the resources used, a volume of memory used, a number of start-up classes used, a number of socket connections used, a number of file connections used, a number of files used, a capacity of files used, a size of classes used, a capacity of ZIP memories used, a volume of CPU used, a volume of socket communications used, and a volume of file writing and reading used;

a resource measurement unit, included within the single common function module, that measures use of the resources by each of the individual function modules of the plurality of individual function modules and that measures use of the resources by the single common function module to execute each of the individual function modules of the plurality of individual function modules, including measuring: the total volume of at least one of the resources used, the volume of memory used, the number of start-up classes used, the number of socket connections used, the number of file connections used, the number of files used, the capacity of files used, the size of classes used, the capacity of ZIP memories used, the volume of CPU used, the volume of socket communications used, and the volume of file writing and reading used; and a second resource limiting unit, included within the single common function module, that limits the use of the resources by each of the individual function modules and by the single common function module to execute each of the individual function modules, based on the plurality of limiting conditions indicated by the resource limiting information acquired by the resource limiting information acquisition unit, and based on the use of the resources by each of the individual function modules and the use of the resources by the single common function module to execute each of the individual function modules, as measured by the resource measurement unit;

the operating system, the single common function module, and the plurality of individual function modules each being programs, stored in a non-transitory computer-readable medium, executed by the processor of the network printer.

2. A printer that manages resources used by a single common function module to execute a plurality of individual function modules, the printer comprising:

- a processor that executes an operating system of the printer, the single common function module, and the plurality of individual function modules, the operating system executing the single common function module;
- a first resource limiting unit, included within the operating system, that limits use of the resources by an entirety of the single common function module and the plurality of individual function modules;
- a resource limiting information acquisition unit, included within the single common function module, that receives resource limiting information from the first resource limiting unit that shows a plurality of limiting conditions of the, resources, the limiting conditions including limits on each of: a total volume of at least one of the resources used, a volume of memory used, a number of start-up classes used, a number of socket connections used, a number of file connections used, a number of files used, a capacity of files used, a size of classes used, a capacity of ZIP memories used, a volume of CPU used, a volume of socket communications used, and a volume of file writing and reading used;
- a resource measurement unit, included within the single common function module, that measures use of the resources by each of the individual function modules of the plurality of individual function modules and that measures use of the resources by the single common function module to execute each of the individual function modules of the plurality of individual function modules, including measuring: the total volume of at least one of the resources used, the volume of memory used, the number of start-up classes used, the number of socket connections used, the number of file connections used, the number of files used, the capacity of files used, the size of classes used, the capacity of ZIP memories used, the volume of CPU used, the volume of socket communications used, and the volume of file writing and reading used; and
- a second resource limiting unit, included within the single common function module, that limits the use of the resources by each of the individual function modules and by the single common function module to execute each of the individual function modules, based on the plurality of limiting conditions indicated by the resource limiting information acquired by the resource limiting information acquisition unit, and based on the use of the resources by each of the individual function modules and the use of the resources by the single common function module to execute each of the individual function modules, as measured by the resource measurement unit.

3. A printer network card that manages resources used by a single common function module to execute a plurality of individual function modules, the printer network card comprising:

- a processor that executes an operating system of the printer network card, the single common function module, and the plurality of individual function modules, the operating system executing the single common function module;
- a first resource limiting unit, included within the operating system, that limits use of the resources by an entirety of the single common function module and the plurality of individual function modules;
- a resource limiting information acquisition unit, included within the single common function module, that receives resource limiting information from the first resource limiting unit that shows a plurality of limiting conditions of the resources, the limiting conditions including limits on each of: a total volume of at least one of the resources used, a volume of memory used, a number of start-up classes used, a number of socket connections used, a number of file connections used, a number of files used, a capacity of files used, a size of classes used, a capacity of ZIP memories used, a volume of CPU used, a volume of socket communications used, and a volume of file writing and reading used;
- a resource measurement unit, included within the single common function module, that measures use of the resources by each of the individual function modules of the plurality of individual function modules and that measures use of the resources by the single common function module to execute each of the individual function modules of the plurality of individual function modules, including measuring: the total volume of at least one of the resources used, the volume of memory used, the number of start-up classes used, the number of socket connections used, the number of file connections used, the number of files used, the capacity of files used, the size of classes used, the capacity of ZIP memories used, the volume of CPU used, the volume of socket communications used, and the volume of file writing and reading used; and
- a second resource limiting unit, included within the single common function module, that limits the use of the resources by each of the individual function modules and by the single common function module to execute each of the individual function modules, based on the plurality of limiting conditions indicated by the resource limiting information acquired by the resource limiting information acquisition unit, and based on the use of the resources by each of the individual function modules and the use of the resources by the single common function module to execute each of the individual function modules, as measured by the resource measurement unit.

4. A resource management method that manages resources used by a single common function module to execute a plurality of individual function modules, the resource management method comprising:

- a first resource limiting step, performed by an operating system that executes the single common function module, for limiting use of an entirety of the resources by the single common function module and the plurality of individual function modules when the single common function module and the plurality of individual function modules are executed by a processor of the network printer;
- a resource limiting information acquiring step, performed by the single common function module, for acquiring resource limiting information that shows a plurality of limiting conditions of the, resources, the limiting conditions including limits on each of: a total volume of at least one of the resources used, a volume of memory used, a number of start-up classes used, a number of socket connections used, a number of file connections used, a number of files used, a capacity of files used, a size of classes used, a capacity of ZIP memories used, a volume of CPU used, a volume of socket communications used, and a volume of file writing and reading used;

a resource measuring step, performed by the single common function module, for measuring use of the resources by each of the individual function modules of the plurality of individual function modules and that measures use of the resources by the single common function module to execute each of the individual function modules of the plurality of individual function modules, including measuring the total volume of at least one of the resources used, the volume of memory used, the number of start-up classes used, the number of socket connections used, the number of file connections used, the number of files used, the capacity of files used, the size of classes used, the capacity of ZIP memories used, the volume of CPU used, the volume of socket communications used, and the volume of file writing and reading used; and a second resource limiting step, performed by the single common function module, for limiting the use of the resources by each of the individual function modules and by the single common function module to execute each of the individual function modules, based on the plurality of limiting conditions indicated by the resource limiting information acquired by the resource limiting information acquiring, and based on the use of the resources by each of the individual function modules and the use of the resources by the single common function module to execute each of the individual function modules, as measured by the resource measuring.

* * * * *